(12) United States Patent
Simon

(10) Patent No.: US 10,652,849 B2
(45) Date of Patent: May 12, 2020

(54) USING BROADCAST PHYSICAL LAYER FOR ONE-WAY TIME TRANSFER OF UNIVERSAL COORDINATED TIME TO RECEIVERS

(71) Applicant: Sinclair Broadcast Group, Inc., Hunt Valley, MD (US)

(72) Inventor: Michael J. Simon, Frederick, MD (US)

(73) Assignee: Sinclair Broadcast Group, Inc., Hunt Valley, MD (US)

(*) Notice: Subject to any disclaimer, the term of this patent is extended or adjusted under 35 U.S.C. 154(b) by 0 days.

(21) Appl. No.: 16/036,570

(22) Filed: Jul. 16, 2018

(65) Prior Publication Data

US 2020/0022100 A1    Jan. 16, 2020

(51) Int. Cl.
*H04J 3/06*       (2006.01)
*H04J 11/00*      (2006.01)
(Continued)

(52) U.S. Cl.
CPC ......... *H04W 56/004* (2013.01); *H04J 3/0602* (2013.01); *H04J 3/0635* (2013.01); *H04L 7/0037* (2013.01); *H04L 7/0054* (2013.01); *H04L 7/0087* (2013.01); *H04L 7/0091* (2013.01); *H04L 43/0852* (2013.01);
(Continued)

(58) Field of Classification Search
CPC .... G06F 11/1604; G06F 11/1675–1695; H04J 3/06–076; H04J 2011/0096; H04L 7/0004–10; H04L 43/0852–087; H04L 43/10–12; H04L 47/28–286; H04L 69/28; H04L 69/323; H04H 20/18;
(Continued)

(56) References Cited

U.S. PATENT DOCUMENTS

2012/0331508 A1* 12/2012 Vare .................... H04L 65/4076
                                                             725/50
2017/0126393 A1    5/2017 Roy et al.
(Continued)

FOREIGN PATENT DOCUMENTS

WO    WO-2017065021 A1 *  4/2017   ......... H04N 21/4302
WO    WO-2017/073336 A1    5/2017

OTHER PUBLICATIONS

*ATSC Standard: ATSC 3.0 System*, Advanced Television Systems Committee, Doc. A/300:2017, Oct. 19, 2017, 56 pages.
(Continued)

*Primary Examiner* — Timothy J Weidner
(74) *Attorney, Agent, or Firm* — Sterne, Kessler, Goldstein & Fox P.L.L.C.

(57) ABSTRACT

Systems and methods for one-way time transfer using physical layer signaling are disclosed herein. According to some examples, a method includes generating timing information based on a clock of a transmitting device, where the timing information comprises a timestamp and metadata. The method further includes generating a preamble of a frame, where the preamble includes the timestamp and the metadata of the timing information. The method also includes forming a frame, where the frame comprises a bootstrap, the preamble, and a payload, and transmitting the frame to a receiver device. The one-way time transfer systems and methods of this disclosure can serve mobile devices that entail quick and reliable establishment of a clock.

20 Claims, 14 Drawing Sheets

(51) Int. Cl.
*H04L 7/00* (2006.01)
*H04L 12/26* (2006.01)
*H04L 29/06* (2006.01)
*H04L 29/08* (2006.01)
*H04N 21/43* (2011.01)
*H04W 56/00* (2009.01)

(52) U.S. Cl.
CPC ............ *H04L 69/28* (2013.01); *H04L 69/323* (2013.01); *H04N 21/4302* (2013.01); *H04W 56/0015* (2013.01); *H04J 2011/0096* (2013.01)

(58) Field of Classification Search
CPC .. H04N 21/242; H04N 21/4302–4307; H04W 56/0005–0095
See application file for complete search history.

(56) References Cited

U.S. PATENT DOCUMENTS

2017/0201761 A1* 7/2017 Walker .................. H04N 19/46
 375/240.13
2018/0054654 A1* 2/2018 Park ..................... H04H 20/426
 375/295
2018/0295409 A1* 10/2018 Takahashi .......... H04N 21/4302
 348/500

OTHER PUBLICATIONS

International Search Report and Written Opinion, dated Oct. 25, 2019, for PCT Patent Appl. No. PCT/US2019/041768, 9 pages.

* cited by examiner

| Component | (N) | BSR (MHz) |
|---|---|---|
| Bootstrap | 0 | 6.144 |
| 6 MHz signal | 2 | 6.912 |
| 7 MHz signal | 5 | 8.064 |
| 8 MHz signal | 8 | 9.216 |

931

| Time Unit | # Samples |
|---|---|
| 1 sec | 384000 × (16+N) |
| 1 ms | 384 × (16+N) |
| 0.5 ms | 192 × (16+N) |
| 0.25 ms | 96 × (16+N) |

FIG. 9B

USING BROADCAST PHYSICAL LAYER FOR ONE-WAY TIME TRANSFER OF UNIVERSAL COORDINATED TIME TO RECEIVERS

BACKGROUND

Field

The present disclosure relates to communications systems, such a Next Generation Broadcast Platform (NGBP) designed to support broadcast/broadband networks including mobile receivers that want to establish a Universal Coordinated Time (UTC) clock reference quickly and reliably. Establishing a UTC clock reference quickly in the mobile receiver is desired, for example, for real-time streaming of multimedia objects of content and, for example, for data delivered using the Moving Picture Experts Group (MPEG) Media Transport (MMT) ISO/IEC 23008-1 standard (which is incorporated herein in its entirety) designed for media delivery in heterogeneous mobile environments.

Related Art

The Advanced Television Systems Committee ATSC 3.0 standard (which is incorporated herein in its entirety) specifies a constrained version of ISO/IEC 23008-1 MMT and defines a one-way time transfer method for transferring the UTC clock reference to receivers. This ATSC 3.0 standard method distributes the timing and metadata signaling required for one-way time transfer across several layers of the ATSC 3.0 protocol stack. This dispersive signaling does not pose a problem for fixed reception devices such as ATSC 3.0 television, one of the diverse service types envisioned for a broadcast platform in the future.

However, the challenging broadcast mobile reception environment (vehicle, phone, tablet, etc.) is very different than fixed television because a UTC clock must be established quickly and reliably in mobile receiver devices. The ATSC 3.0 one-way time transfer method is not effective use in mobile environments. The dispersion of time transfer signaling across several layers in ATSC 3.0 protocol stack results in both less robust signaling and additional delay (e.g., latency for waiting for upper layer signaling tables to be available and to be sent.) In ATSC 3.0 standard, this dispersion of signaling can save some bits when designed for stationary fixed television services. However, this method is not acceptable for mobile and battery powered devices that need to receive and recover broadcast signal and consume broadcast content quickly which is dependent on availability of UTC clock reference on the receiver device.

Mobile devices must connect and quickly consume content in the broadcast signal to enable diverse use cases and battery efficiency. The radio frequency (RF) propagation physics is very different for a mobile device in a moving vehicle or in a user's pocket or hand compared to a fixed television receiver device in the living room.

SUMMARY

The one-way time transfer systems and methods of this disclosure can serve mobile devices that entail both quick and reliable establishment of a UTC clock. According to some embodiments, using the physical layer signaling (e.g., the ATSC 3.0 physical layer L1 signaling) can result in a robustness of approximately −9 dB Signal to Noise Ratio (SNR) in Additive White Gaussian Noise (AWGN) environment to support challenging mobile environments. The methods of this disclosure are more robust compared to methods carrying timing information dispersed in the upper layers in ATSC 3.0 with weaker error protection and latency for access. Fixed stationary receivers in a stable environment can store previously successfully received metadata of the timing information into memory, but mobile devices want to quickly connect without dependency of any previous reception state information and consume the broadcast signal content including reconnecting quickly caused by fading in mobile environment.

The dependency on upper layers for one-way time transfer (e.g., in the ATSC 3.0 standard) also precludes a clean decoupling of the upper layers above physical layer. According to some embodiments of this disclosure, methods and systems are disclosed to solve these issues by relying on the physical layer alone to effect time transfer. The systems and method of this disclosure can result in extensibility and diverse use cases in the future by replacing the upper layers of ATSC 3.0 (no dependency for one-way time transfer) with, for example, the ISO/IEC MMT 23008-1 standard enhanced for mobile.

According to some embodiments, the systems and methods of this disclosure use the lowest level signaling (for example, in the ATSC 3.0 physical layer A/321, A/322) for one-way time transfer resulting in more reliable and faster reception and consumption of content at mobile devices. Therefore, the speed, the robustness, and the extensibility of using the broadcast physical layer alone for one-way time transfer method is disclosed in some embodiments to meet the requirements of mobile environments.

For example, for the one-way time transfer methods according to some embodiments using the physical layer, new signaling syntax is introduced that can be hidden so as not to be detectable by fixed legacy devices. This provides both backward compatibility and new signaling for the establishment of one-way time transfer quickly and reliably for new mobile environments. According to some embodiments, a small number of additional physical layer signaling bits is used to transmit one-way time transfer for enabling mobility and evolution in the mobile environments in addition to fixed devices.

The ATSC 3.0 standard is an Internet Protocol (IP) based standard capable of supporting harmonized broadcast and broadband services. To enable seamless hybrid operation, ISO/IEC 23008-1 MPEG Media Transport (MMT), which is incorporated herein in its entirety, can be used. The MMT standard was designed in response to the requirements of a new media consumption paradigm, where content can be accessed anywhere through heterogeneous scenarios and by a large variety of devices. Next Generation Broadcast Platform (NGBP) will not work as traditional independent content delivery systems, but as a part of a content delivery platform using broadband networks. Moreover, use of both broadcast and broadband networks will be transparent to the users who consume the content without being aware of the used delivery systems.

The MMT standard is different than the previous MPEG multimedia delivery technologies, such as MPEG2 TS that is used in ATSC 1.0 that provides for synchronized multimedia play-back of timed media designated with relative clock references and timestamps (PCR, PTS, DTS, etc.) placed directly in the stream at the time of delivery in channel. The timing model in MMT is quite different in which media is first encapsulated into a ISOBMFF ISO/IEC 14496-12 file format using a unique brand termed MPU with all the embedded timing providing for proper playback continuity. The encapsulated MPU is then transported using MPEG Media Transport Protocol (MMTP) supporting UTC where every node in the delivery path has the UTC clock reference. The media sources (e.g., the transmit side) and receivers all have a common UTC clock reference and use timestamps based on the UTC clock for orchestrating the MMTP delivery and consumption times of content/data of a service independent of the delivery channel.

An MMT presentation timeline for content/data is based on UTC clock, is established on the MMT transmitter side, and is signaled to the receiver side using a defined protocol that can be independent of delivery channel and possibly from the content/data that was previously delivered or is now stored in, for example, an storage on the receiver. This can be used to establish seamless playback of the content on the receiver independent of when or from where the content was delivered or is now cached given a UTC clock is first established on the receiver side. Each MMT content or asset (Audio/Video, etc.) can have a unique asset identifier (ID) that is assigned, managed, and can be globally unique. This unique asset ID then is correlated to the UTC clock timestamp for playback or presentation that is signaled from the MMT transmitter.

The ATSC 3.0 standard describes a one-way time transfer method using the ATSC 3.0 broadcast signal. The use of radio electromagnetic waves to achieve one-way time transfer can be used by many systems including, for example, the National Institute of Standards and Technology (NIST) (which operates stations WWV in the high frequency (HF) portion of the radio spectrum for time transfer) and the US Airforce, which operates the global GPS system. These systems have a one-way time transfer accuracy designed for the intended purposes. The ATSC 3.0 broadcast system, when calibrated, can deliver time accuracy for the intended purposes. One error in received UTC time is the delay (e.g., flight time) of broadcast signal from broadcast transmitter antenna to the receiver devices of about 3.3 µs/km given the speed of light of radio propagation.

This time transfer accuracy can also be improved with methods to be disclosed. Using broadcast transmitters, the one-way time transfer methods described in this disclosure are more accurate than internet based Network Time Protocol (NTP) servers two-way time transfer, are more ubiquitous, and no broadband connection is required.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 9B illustrates using baseband sampling rate (BSR) in establishing a TAI/UTC clock using the broadcast physical layer, according to some embodiments.

Figure 1A:
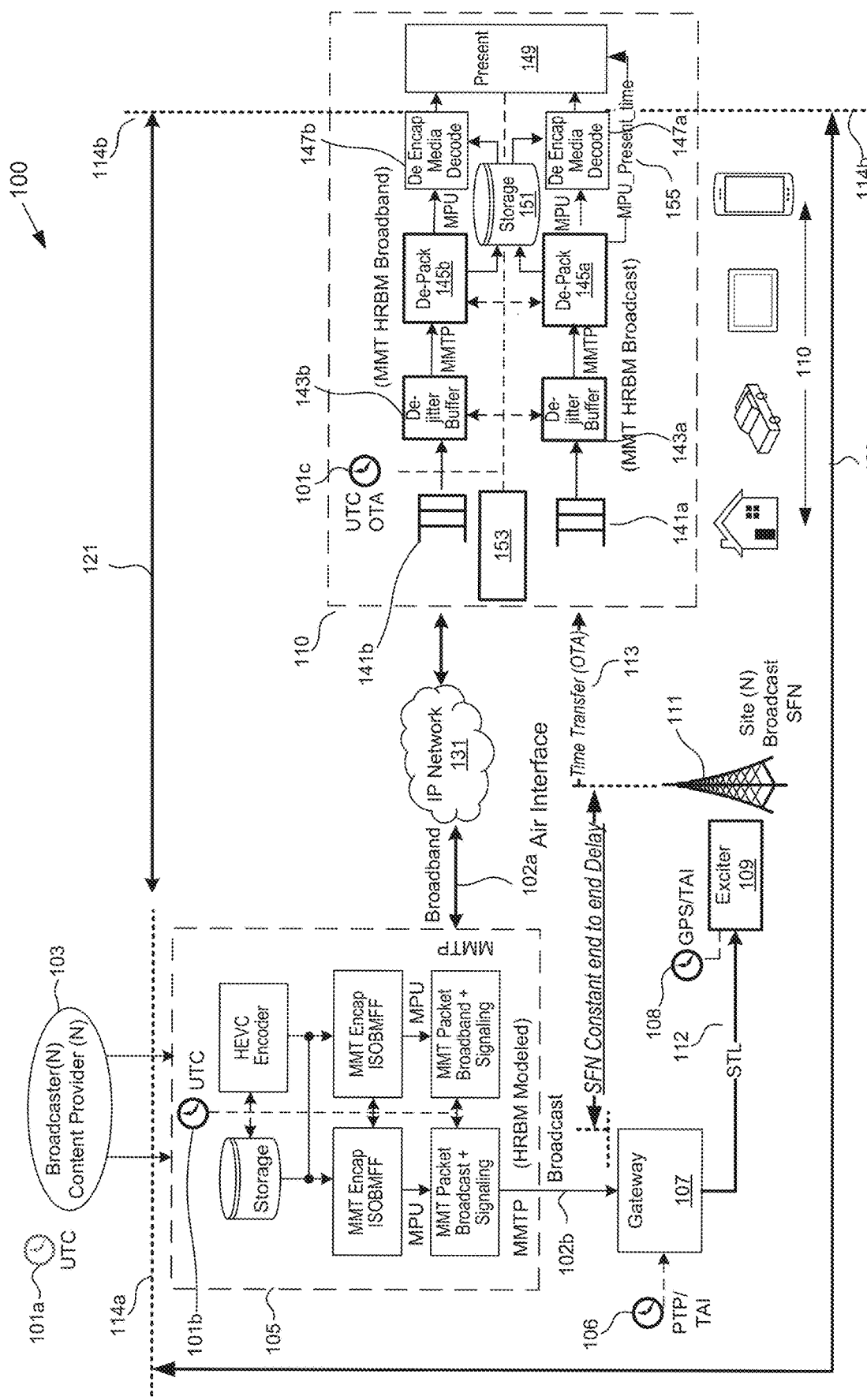
FIG. 1A a block diagram of a hybrid broadcast/broadband network, according to some embodiments.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

FIG. 1A illustrates a block diagram of a hybrid broadcast/broadband network 100, according to some embodiments. Network 100 illustrates an end to end IP content/data flow using, for example, the ISO/IEC 23008-1 MMT (MPEG Media Transport) standard and timing model to enable a heterogeneous network. It is noted that although FIG. 1A is discussed with respect to MMT standard for context, the embodiments of this disclosure are not limited to this standard.

According to some embodiments, and as illustrated in FIG. 1A, the MMT standard operates using a common UTC clock 101a at the broadcaster/content provider entity 103, a common UTC clock 101b at the MMT sending entity 105, and a common UTC clock 101c established on the receiver device 110 using the over the air (OTA) broadcast signal 113. According to some embodiments, one or more of the clocks 101a, 101b, and 101c can include a circuit (e.g., a clock generator) configured to generate a timing signal for use in synchronizing of their respective circuit, device, or system. One or more of the clocks 101a, 101b, and 101c can include programmable clock generators that can be established and adjusted and become the basis for generating timestamps to control the delivery and presentation of the media. The UTC clock 101c of the receiver device 110 is first established, and later adjusted, using the over the air (OTA) broadcast signal one-way time transfer to become coherent to UTC before the synchronized broadcast/broadband system delivery and consumption of content is performed.

Network 100 includes the broadcaster/content provider 103 configured to transmit content/data over an interface 114a to the MMT sending entity 105. According to some embodiments, the MMT sending entity 105 is configured to transmit processed content/data over broadband interface 102a and/or broadcast interface 102b in a UTC synchronized manner. As illustrated in FIG. 1A, the broadcaster/content provider 103 includes the UTC clock 101a and the MMT sending entity 105 on the network side includes the UTC clock 101b. The MMT sending entity 105 can control both broadcast and broadband interfaces for content transport.

Within the hybrid broadcast/broadband network 100, the MMT sending entity 105 is configured to transmit content to one or more receiver devices 110 using broadcast and/or broadband. For example, the MMT sending entity 105 can transmit the content (or part of the content) to the receiver device 110 using broadband through the network 131. According to some examples, the network 131 can include an Internet Protocol (IP) network such as but not limited to Local Area Network (LAN), Wide Area Network (WAN), Personal Area Network (PAN), Metropolitan Area Network (MAN), Storage Area Network (SAN), Enterprise Area Network (EPN), Virtual Private Network (VPN), or the like. Additionally or alternatively, the MMT sending entity 105 can transmit the content (or part of the content) using broadcast using, for example, over the air (OTA) signal 113 and gateway 107, exciter 109, and transmitter 111.

The MMT sending entity 105 can include circuits or modules configured to receive the content from the broadcaster/content provider 103, convert the received content to data to be transmitted to the receiver device 110 over broadcast or broadband interfaces 102b, 102a, and transmit the converted data. In some examples, the MMT sending entity 105 can be configured based on MPEG Multimedia Transport Protocol (MMTP). However, the embodiments of this disclosure are not limited to this example and the MMT sending entity 105 can include other transmitters.

For example, the MMT sending entity 105 can include a storage configured to store content received from the broadcaster/content provider 103 before transmitting. The MMT sending entity 105 can also include an encoder (such as but not limited to High Efficiency Video Coding (HEVC) encoder) configured to encode or compress the content. The encoded content can further be stored at the storage of the MMT sending entity 105.

Additionally, the MMT sending entity 105 can include one or more circuits or modules configured to change the format of the encoded content. For example, the MMT sending entity 105 can include one or more circuits or modules configured based on MMT such that they can encapsulate the encoded content to an ISO base media file format (ISOBMFF).

The MMT sending entity 105 can further include one or more circuits or modules (e.g., MMT packet broadcast and signaling) configured to generate broadcast packets and signaling based on, for example, the reformatted content. The MMT sending entity 105 is configured to transmit the broadcast packets and signaling to the gateway 107 for transmission over broadcast. According to some examples, the MMT sending entity 105 transmits the broadcast packets and signaling to the gateway 107 using MMTP/User Datagram Protocol (UDP)/IP. The operation of the MMT sending entity 105 to deliver the broadcast packets and signaling can be based on the UTC clock 101b.

The MMT sending entity 105 can further include one or more circuits or modules (e.g., MMT packet broadband and signaling) configured to generate broadband packets and signaling based on, for example, the reformatted content. The MMT sending entity 105 is configured to transmit the broadband packets and signaling over interface 102a and the network 131 to the receiver device 110. According to some examples, the MMT sending entity 105 transmits the broadband packets and signaling over the network 131 using MMTP/Transmission Control Protocol (TCP)/IP. The operation of the MMT sending entity 105 to generate and deliver the broadband packets and signaling can be based on the UTC clock 101b.

As illustrated in FIG. 1A, the network 100 can also include the gateway 107, the exciter 109, and the transmitter 111. According to some embodiments, the gateway 107, the exciter 109, and the transmitter 111 operate with the MMT sending entity 105 to broadcast content/data to the one or more receivers 110. According to some examples, gateway 107 can include an ATSC 3.0 gateway (scheduler). In some examples, the exciter 109 can include an ATSC 3.0 exciter. And in some examples, the transmitter 111 can include a single frequency network (SFN) transmitter. It is noted that these are provided as examples and the gateway 107, the exciter 109, and/or the transmitter 111 can include other gateways, exciters, and/or transmitters, respectively. Also, although one gateway, one exciter, and one transmitter are shown in FIG. 1A, the embodiments of this disclosure are not limited to this example, and one or more gateways, one or more exciters, one or more transmitters, or a combination thereof can be used.

According to some examples, and as illustrated in FIG. 1A, the gateway 107 can include or be associated with a clock 106. The clock 106 can reference an International Atomic Time (TAI) clock such is available from GPS. Note the difference is TAI clock is monotonically increasing whereas a UTC clock used for civil timekeeping contains leap seconds. TAI time can be converted to UTC given proper metadata signaling such as number of leap seconds and time zone, etc. Additionally, the exciter 109 can include or be associated with a clock 108. The clock 108 can also include a TAI clock. The clocks 106 and 108 can be monotonically increasing clocks that use the Global Positioning System (GPS). According to some examples, the clocks 106 and 108 can be used for ATSC 3.0 physical layer synchronization for establishing an SFN between the gateway 107 (e.g., centrally located) to the exciter 109 (e.g., located at transmitter site) over the studio to transmitter link (STL) 112. According to some embodiments, one or more of the clocks 106 and 108 can include a circuit (e.g., a clock generator) configured to generate a timing signal for use in synchronizing of their respective circuit, device, or system. One or more of the clocks 106 and 108 can include programmable clock generators that can be established and adjusted.

The gateway 107, the exciter 109, and the transmitter 111 are configured to receive the broadcast content from the MMT sending entity 105 via interface 102b and broadcast content, after necessary processing, to the one or more receivers 110. Part of the operations of the gateway 107, the exciter 109, and the transmitter 111 include transmitting timing information to the receiver device 110 to establish UTC clock 101c. The timing information is based on the clocks 106 or 108 and can include timestamps and metadata. The receiver 110 includes the UTC clock 101c. The receiver 110 uses the transmitted timestamps and metadata to establish its UTC clock 101c as will be disclosed in detail. As illustrated in FIG. 1A, the network 100 includes the one or more receiver devices 110. According to some embodiments, the receiver device 110 is configured to simultaneously receive both broadcast signal(s) (e.g., ATSC 3.0 broadcast signal(s)) and broadband signal(s).

According to some examples, an SFN protocol has a constant end to end delay established between the input of the gateway 107 to the air interface of an antenna at the transmitter 111. Given, that this constant delay is known by the gateway 107, the gateway 107 can generate timestamps based on its TAI clock 106 that are inserted in each frame (e.g., ATSC 3.0 frame) transmitted by the transmitter 111. These TAI timestamps are calibrated with respect to known constant delay to be accurate at the exact instance the frame begins emission at the air interface of the antenna of the transmitter 111 which becomes the time calibration point, according to some embodiments.

The over the air (OTA) signal 113 is received at the receiver 110. The receiver 110 is configured to receive both broadcast signal(s) (e.g., ATSC 3.0 broadcast signal(s)) and broadband signal(s). The received frame within the OTA signal 113 can be used to instantiate the UTC clock 101c at the receiver 110 using, for example, the one-way time transfer and demodulation and time recovery circuit 153. One inaccuracy in the received calibrated timestamps in the received OTA signal 113 can include the delay or flight time of signal from the transmitter 111 to the receiver device 110. According to some examples, given the speed of light, the inaccuracy in the received timestamps is about 3.3 µs/km. This time transfer which for example has an error of around 33 µs when the receiver device 110 is located about 10 km from the transmitter 111 can be satisfactory for the intended use and can be more accurate than time transfer delivered through internet based NTP servers.

As discussed in more detail, the gateway 107 is configured to place the timing information including the timestamp and associated metadata in the frame broadcasted by the transmitter 111 using physical layer signaling. For example, the timestamp and associated metadata can be placed in the preamble of the frame that is transmitted to the receiver device 110. Accordingly, the receiver device 110 can be configured to detect the timestamp and associated metadata at the physical layer and using the physical layer signaling the details of which will be disclosed later.

As discussed above, and assuming the UTC clock 101c is available details of which will be disclosed later, the MMT sending entity 105 operates based on the MMT timing model. The MMT delivery protocol can specify a Hypothetical Receiver Buffer Model (HRBM) that is modeled at the MMT sending entity 105 side and is also established at the receiver device 110 side of broadcast/broadband channels by signaling. In this example, the HRBM protocol enables a constant end to end delay over paths 121, 123 under the control of the MMT sending entity 105.

Figure 1B:
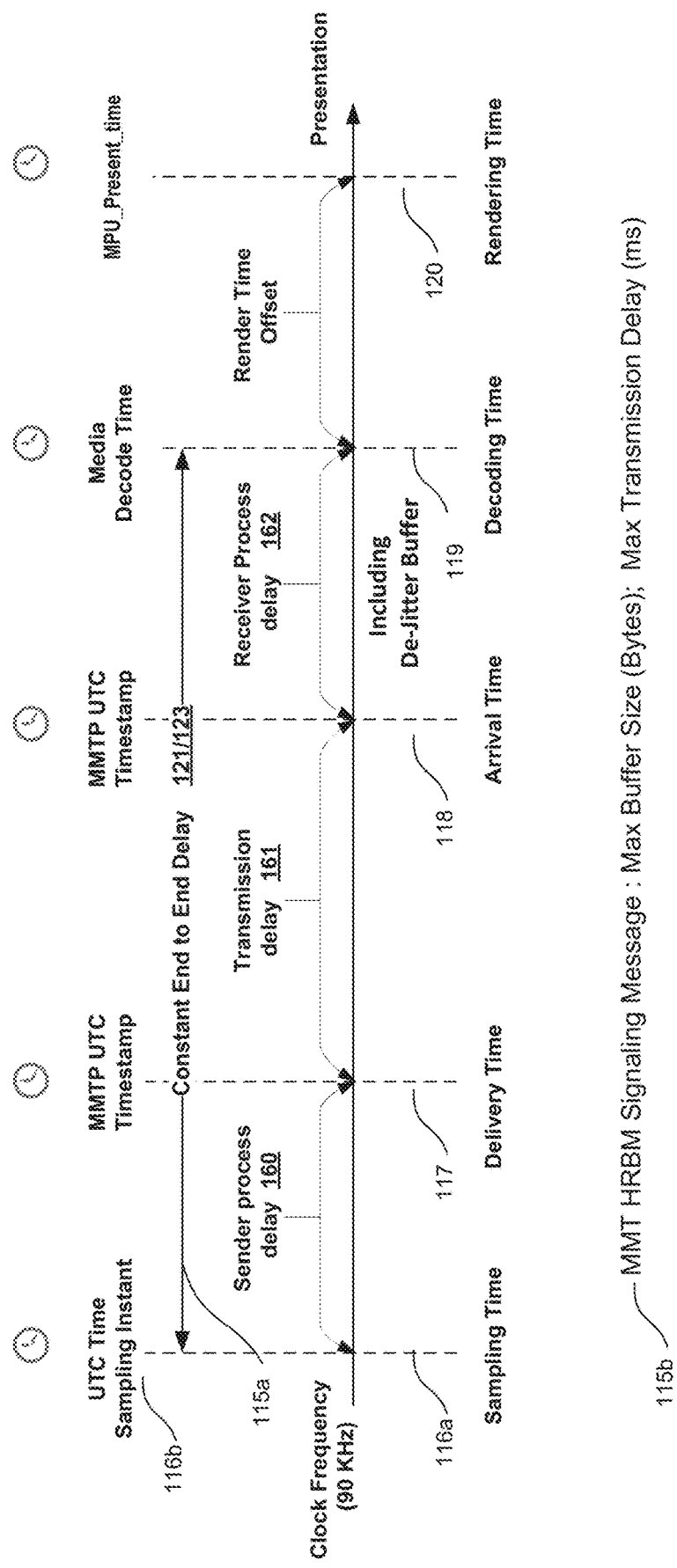
FIG. 1B is the timing model of MMT hybrid broadcast/broadband network using UTC timestamps and the MMT Hypothetical Receiver Buffer Model (HRBM), according to some embodiments.

An MMT timing model will now be discussed with respect to FIG. 1B and referenced to entities in FIG. 1A. FIG. 1B illustrates a timing model of MMT hybrid broadcast/broadband network using UTC timestamps and the MMT Hypothetical Receiver Buffer Model (HRBM), according to some examples. According to some embodiments, a sampling time instant 116a, which can be based on an MPEG standard 90 kHz media clock, is correlated 116b with UTC clock 101b of the MMT sending entity 105. The value of the sampling time instant 116a is inserted in an MMTP packet header, according to some examples. This sampling time instant 116a correlates with the interface 114a and represents the instant the media (e.g., video, audio, etc.) first entered the encoder of the MMT sending entity 105. The delivery time 117 is after the processing delay 160 of the MMT sending entity 105. The delivery time 117 can also be placed in the MMTP packet header as a UTC timestamp indicating the instant MMTP packet is released from the MMT sending entity 105 into broadband/broadcast interfaces 102a, 102b. The arrival time 118 is the instant the MMTP packet with the delivery timestamp 117 enters the buffers 141a, 141b of the receiver device 110 after experiencing transmission delay 161 on broadcast/broadband networks. When the MMTP packet arrives at the buffers 141a, 141b of the receiver device 110, the local UTC clock 101c of the receiver device 110 is observed and the exact transmission delay 161 can be calculated by subtracting the deliver timestamp 117 from the UTC time observed on the UTC clock 101c. According to some embodiments, broadband/broadcast networks can have different delays.

The decoding time 119 occurs after all the process delay 162 within the receiver device 110. The process delay 162 within the receiver device 110 can include the process time of the De-Jitter buffers 143a, 143b, the process time of the De-Packetizations 145a, 145b, and the process time of the De-Encapsulation Decoders 147a, 147b. The operations of the De jitter buffers 143a, 143b, the De-Packetizations 145a, 145b, and the De-Encapsulation Decoders 147a, 147b can be controlled by HRBM signaling messages to ensure a constant delay 121, 123 on broadband/broadcast path between interface 114a and point 114b after the De-Encapsulation Decoders 147a, 147b.

According to some embodiments, the MMT sending entity 105 also transmits HRBM signaling messages 115b to the receiver device 110. The receiver device 110, using the De-Jitter buffers 143a, 143b, uses the HRBM signaling messages 115 to ensure a constant end to end delay. According to some examples, the HRBM parameters signaled by the HRBM signaling messages 115b can include a maximum buffer size (bytes) and a maximum transmission delay (ms). The HRBM signaling messages 115b are modeled at MMT sending entity 105, and a value of the maximum transmission delay (ms) is selected that is longer (measured or calculated) than the largest delay of either the broadband or broadcast path.

The exact UTC time (ms) an MMTP packet remains buffered in (De-Jitter buffer (e.g., buffers 143a, 143b) is equal to the signaled (Max Transmission Delay)−[Sender Process Delay+Transmission Delay+Receiver Process Delay]. The HRBM model ensures that no packets are dropped due to buffer overflow and all MMTP packets received experience the same end to end delay 121, 123, independent of broadband/broadcast delivery channel, and therefore can be presented 149 synchronized under UTC timestamps. The rendering time 120 is when the audio or video should be rendered or played. The rendering time 120 is also signaled by MMT sending entity 105 as MPU_Present_Time using UTC as shown in FIG. 1B and as 155 shown in FIG. 1A being removed from the MMT De-Packetization 145a. The De-Packetization 145a of the receiver device 110 decouples the media from the signaling and renders MPU_Present_Time presentation time 155 that indicates the rendering time 120. Content stored in storage 151 at the receiver device 110 can also be synchronously presented. The content stored in storage 151 can include, for example, personal targeted advertising. The content stored in storage 151 can be signaled using an MMT unique asset ID and can be correlated with presentation time 155 UTC.

The above discussion assumed the UTC clock was available at receiver 101c. The receiver device 110 also includes a demodulation and time recovery circuit 153. The demodulation and time recovery circuit 153 can be configured to receive the OTA signal 113 and recover the timestamps and associated metadata. The demodulation and time recovery circuit 153 can use the recovered timestamps and associated metadata to establish or adjust the UTC clock 101c. The UTC clock 101c can be used within the receiver device 110, for example, for recovery of the data and content from the received packets and playback of the data and content. The UTC clock 101c is established at the receiver device 110 such that the receiver device 110 is able to manage buffers and playback of contents/data using the UTC clock 101c. By using the MMT standards' central orchestration and timing, services can be can be adjusted (scheduled) independently for a heterogeneous network delivery involving broadcast and/or broadband.

For example, an MMT presentation timeline can be established for content playback. According to some embodiments, a signal (e.g., MPU_present_time 155) is generated and used in the receiver device 110 for timing of the content playback in the receiver device 110. The presentation time 155 can be generated based on the UTC clock 101c of the receiver device 110 and can be independent of the delivery method of the content to be play (e.g., delivered using broadcast, broadband, or from a storage within the receiver device 110 where a previously delivered content was stored.) In some examples, the presentation time 155 can orchestrate when playback from the de-pack buffers (broadcast/broadband) or playback from local storage (e.g., local cache storage) is to occur based on the UTC time from, for example, the UTC clock 101c. According to some examples, the MMT standard can also enable the composition or presentation of media using HTML5.

Figure 2:
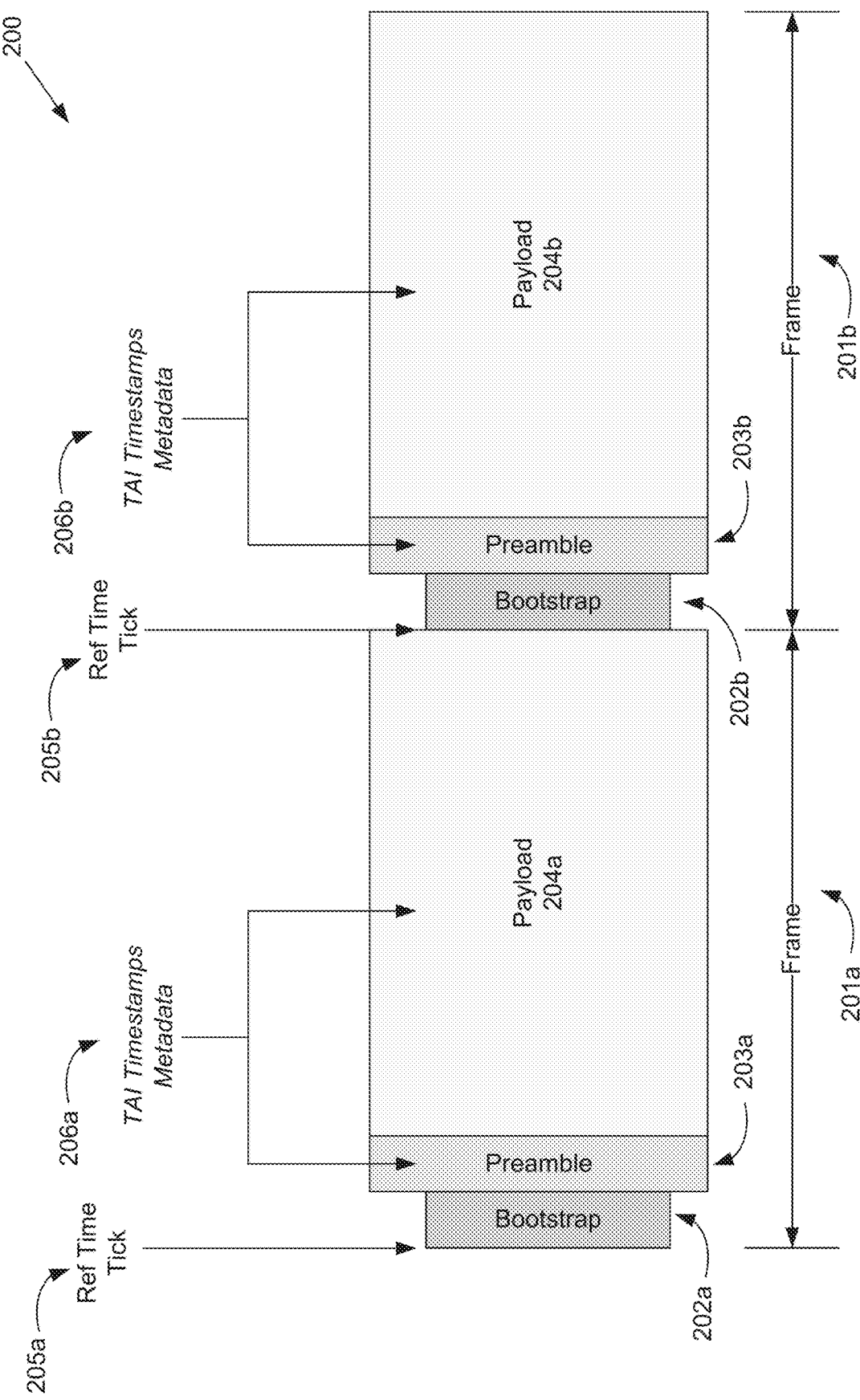
FIG. 2 illustrates frames and the location of timestamps and metadata for one-way time transfer, according to some embodiments.

FIG. 2 illustrates a signal 200 including two frames, according to some embodiments of this disclosure. Signal 200 can include a first frame 201a and a second frame 201b. Although two frames are illustrated in FIG. 2, the embodiments of this disclosure are not limited to this example and any number of frames can be used.

According to some examples, the frame 201a can include bootstrap 202a, preamble 203a, and payload 204a. The frame 201b can also include a bootstrap 202b, a preamble 203b, and a payload 204b. According to some examples, frames 201a and 201b (collectively referred to as frame 201) can be ATSC 3.0 frames (frames created based on ATSC 3.0 standard specification.) For example, the bootstraps 202a and 202b (collectively referred to as bootstrap 202) can be based on ATSC 3.0 A/321 (which is incorporated herein in its entirety.) Also, the preambles 203a and 203b (collectively referred to as preamble 203) can be based on ATSC 3.0 A/322 (which is incorporated herein in its entirety.) Similarly, the payloads 204a and 204b (collectively referred to as payload 204) can be based on the ATSC 3.0 A/322.

According to some examples, signal 200 is generated by the gateway 107 and/or the exciter 109 and is transmitted using the transmitter 111 of FIG. 1A. Signal 200 can include the timing information to be transmitted to the receiver 110 of FIG. 1A. For example, the frame 201a can include the TAI timestamp and metadata 206a. The frame 201b can also include the TAI timestamp and metadata 206b. Each of the TAI timestamps and metadata 206a and 206b (collectively referred to as TAI timestamp and metadata 206) are correlated to the beginning of its respective frame's bootstrap. For example, TAI timestamp and metadata 206a are correlated to the beginning of bootstrap 202a of frame 201a. This frame beginning is illustrated in FIG. 2 as reference time tick 205a, 205b, respectively, which is the beginning of the first bootstrap symbol calibrated at antenna air interface of transmitter 111 of FIG. 1A.

The TAI timestamps and metadata 206 are used for one-way time transfer. According to some examples, the TAI timestamp and metadata 206a can be dispersed over the preamble 203a and the payload 204a of the frame 201a. The TAI timestamp and metadata 206b can also be dispersed over the preamble 203b and the payload 204b of the frame 201b. In other words, each of the TAI timestamps and metadata 206 includes a plurality of bits and the plurality of each of the TAI timestamps and metadata are dispersed over the respective preamble 203 and the respective payload 204. In one example, a portion of the full 80 bit TAI timestamp is placed in the preamble 203 and remainder of TAI Timestamp bits and the metadata 206 associated with the TAI timestamps is placed at the payload 204.

Figure 3:
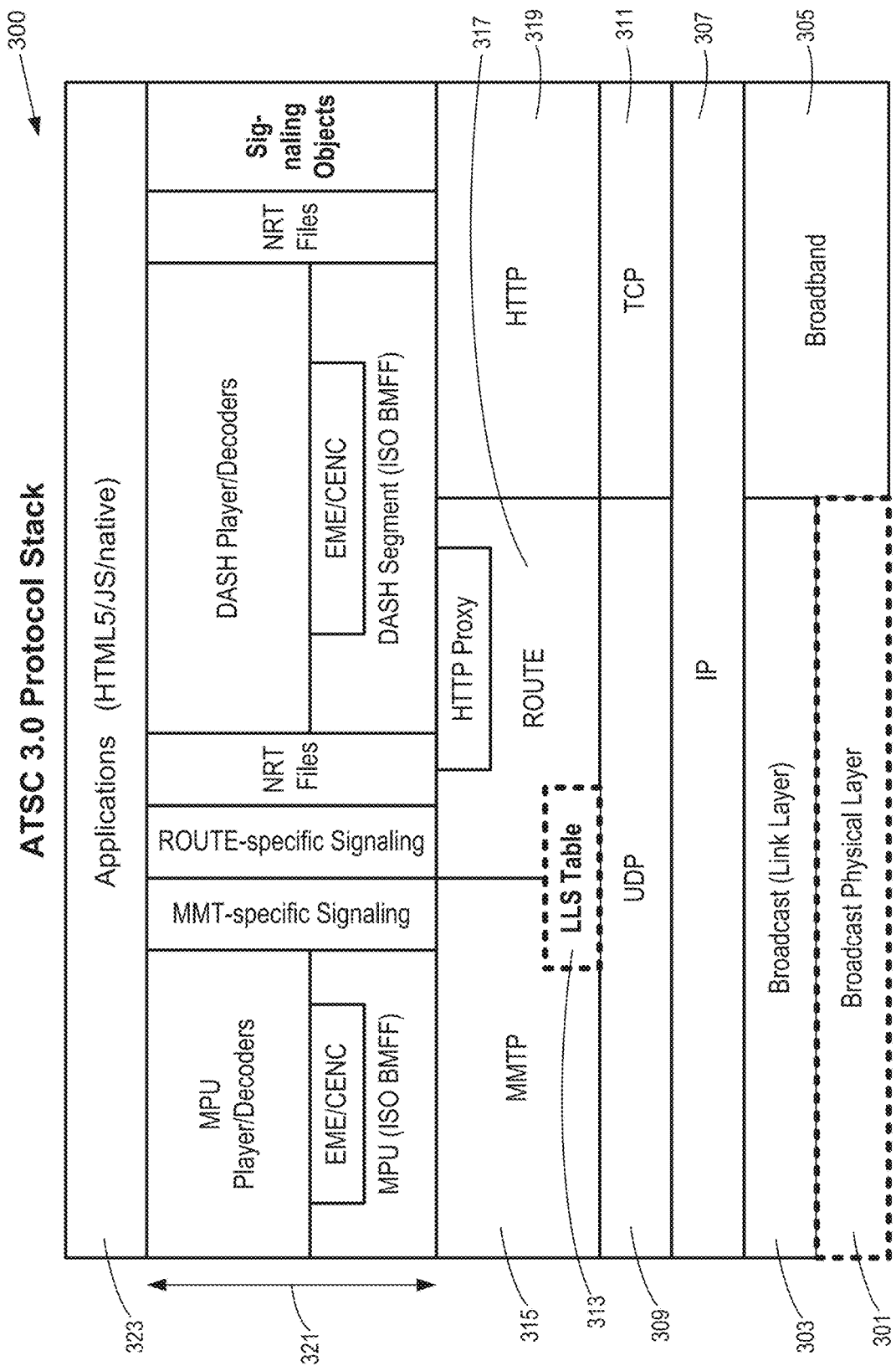
FIG. 3 illustrates an exemplary protocol stack, according to some embodiments.

FIG. 3 illustrates a protocol stack 300, according to some embodiments of this disclosure. The protocol stack 300 illustrates the dispersed layers used to carry the timestamps and metadata for the on-way time transfer. Protocol stack 300 can include a ATSC 3.0 protocol stack used within the ATSC 3.0 system such as, but not limited to gateway 107, exciter 109, or transmitter 111 of FIG. 1A. According to some examples, a frame transmitted from the transmitter 111 to the receiver 110 of FIG. 1A is encoded based on the protocol stack 300.

As illustrated in FIG. 3, the protocol stack 300 can include a broadcast physical layer 301, a broadcast link layer 303, and a broadband layer 305 (which can include a broadband physical layer and a broadband data link layer). According to some examples, the layers 301 and 305 (e.g., a physical layer part of the layer 305) are used for information on how to decode the frame at the rest of the protocol stack 300.

The protocol stack 300 can further include the internet protocol (IP) layer 307. The IP layer 307 can be shared between the broadcast and baseband parts of the protocol stack 300. The protocol stack 300 further includes a User Datagram Protocol (UDP) layer 309 and a Transmission Control Protocol (TCP) layer 311. The UDP layer 309 can be associated to the broadcast section of the protocol stack 300 and the TCP layer 311 can be associated with the broadband section of the protocol stack 300.

The protocol stack 300 further includes a Low Level Signaling (LLS) layer 313, a Multimedia Multiplexing Transport Protocol (MMTP) layer 315, a Real-time Object delivery over Unidirectional Transport (ROUTE) layer 317, and HTTP layer 319. According to some examples, the MMPT layer 315 can be used as a transport protocol in broadcast delivery of, for example, media processing units (MPUs), the ROUTE layer 317 can be used for delivery of data streams, and the HTTP layer 317 can be used for broadband delivery.

Layer 321 of the protocol stack 300 can include a number of protocols to be used to receive the data and signaling from layers 315, 317, and 319, and convert the received data and the signaling to data and signaling compatible with the applications layer 323.

As discussed above with respect to FIG. 2, the timing information including the TAI timestamps and metadata 206 used for the one-way time transfer can be dispersed over their respective preamble and payload. As illustrated in FIG. 3, the timestamp and the metadata associated with the one-way time transfer is dispersed between two different layers—the broadcast physical layer 301 and the LLS table 313. In this example, the timestamp signaling is transmitted and is received (and recovered) based on the physical layer 301 and the metadata associated with the timestamp is transmitted and is received (and recovered) using the upper layer LLS table 313. According to some examples, the upper layer LLS table 313 is sent at a low periodicity and low robustness and would normally be stored by a fixed connected receiver.

Figure 4:
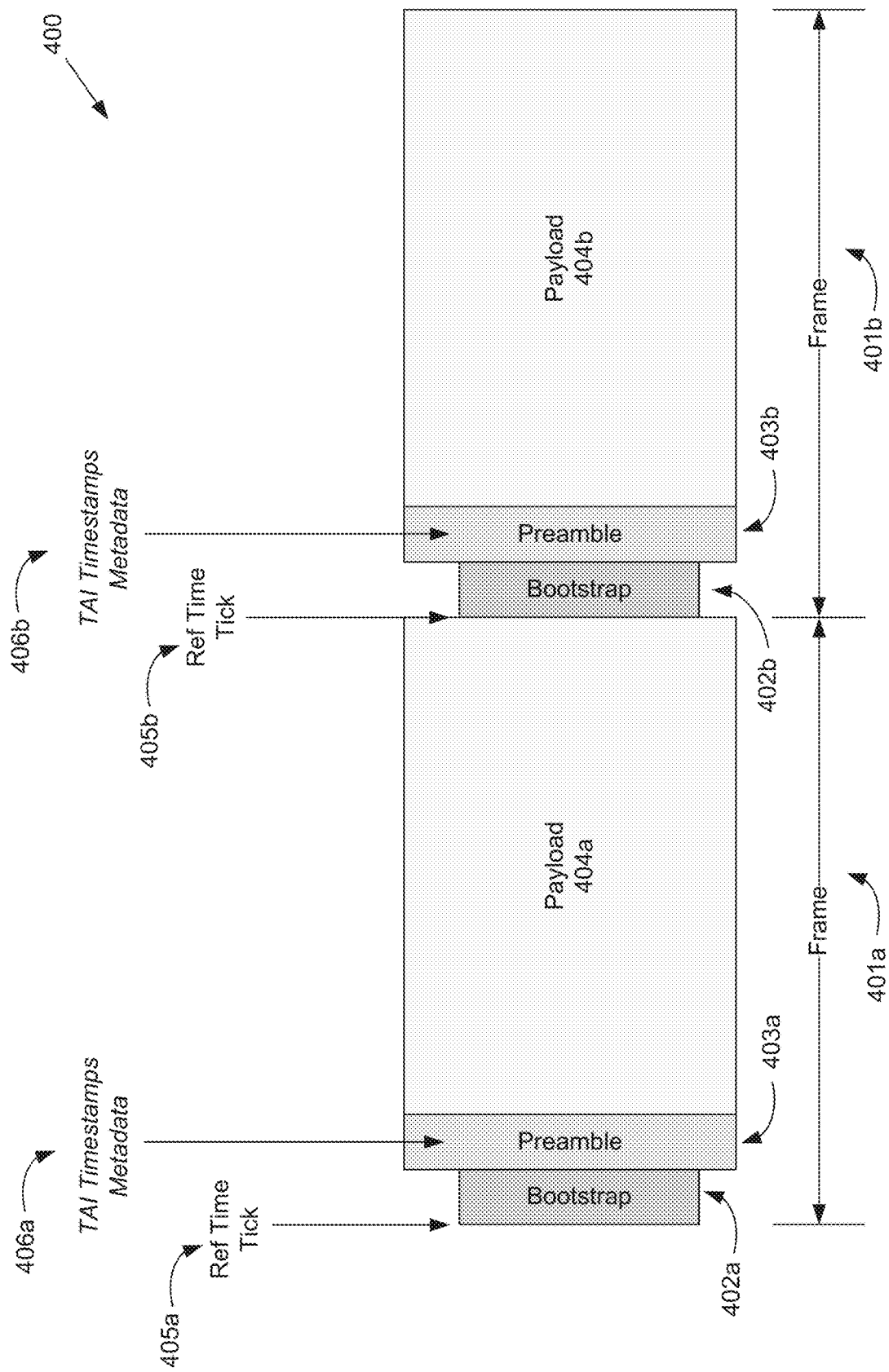
FIG. 4 illustrates frames and the location of timestamps and metadata for one-way time transfer in mobile environments, according to some embodiments.

FIG. 4 illustrates a signal 400 including two frames, according to some embodiments of this disclosure. Signal 400 can include a first frame 401a and a second frame 401b. Although two frames are illustrated in FIG. 4, the embodiments of this disclosure are not limited to this example and any number of frames can be used.

According to some examples, the frame 401a can include bootstrap 402a, preamble 403a, and payload 404a. The frame 401b can also include a bootstrap 402b, a preamble 403b, and a payload 404b. According to some examples, frames 401a and 401b (collectively referred to as frame 401) can be ATSC 3.0 frames. For example, the bootstraps 402a and 402b (collectively referred to as bootstrap 202) can be based on ATSC 3.0 A/321. Also, the preambles 403a and 403b (collectively referred to as preamble 403) can be based on ATSC 3.0 A/322. Similarly, the payloads 404a and 404b (collectively referred to as payload 404) can be based on the ATSC 3.0 A/322.

According to some examples, and as illustrated in FIG. 4, the bootstrap 402 is located at the beginning of the frame 401. The bootstrap 402 can be used to indicate, at a low level, the type of form of the frame 401 that is being transmitted during a particular time period such that a receiver device can discover and identify the frame 401. The bootstrap 402 can also be used to indicate to the receiver device how to receive the services that are available via the frame 401. The preamble 403 is located after the bootstrap 402. According to some examples, the preamble 403 is located immediately following the bootstrap 402. The preamble 403 includes control signaling (e.g., L1 control signaling ATSC 3.0 A/322 specification) applicable to the remainder (e.g., the payload 404) of the frame 401. Preamble 403 can include one or more preamble symbols. Some information associated with the preamble 403 (such as but not limited to fast Fourier transform (FFT) size, guard interval, scattered pilot pattern) can be signaled by the bootstrap 402. The payload 404 is located after the preamble 403 can include a set of time-frequency resources, for example, an integer number of Orthogonal Frequency Division Multiplexing (OFDM) symbols in the time dimension. The payload 404 includes the content/data to be transmitted to the receiver device.

According to some examples, the bootstrap 402 and the preamble 403 are generated and transmitted by a transmitting device and are received and recovered by a receiver device using physical layer signaling. In some examples, the payload 404 is generated and transmitted by a transmitting device and is received and recovered by a receiver device using signaling based on layers above the physical layer. According to some embodiments, the physical layer (or layer 1) is the first and lowest layer in a seven-layer Open Systems Interconnection model (OSI model) of communication and computer networking. The seven layers of the OSI model can include physical layer, data link layer, network layer, transport layer, session layer, presentation later, application layer.

According to some examples, signal 400 is generated by the gateway 107 and/or the exciter 109 and is transmitted using the transmitter 111 of FIG. 1A. Signal 400 can include the timing information to be transmitted to the receiver 110 of FIG. 1A. For example, the frame 401a can include the TAI timestamp and metadata 406a. The frame 401b can also include the TAI timestamp and metadata 406b. Each of the TAI timestamps and metadata 406a and 406b (collectively referred to as TAI timestamp and metadata 406) are correlated to the beginning of its respective frame's bootstrap. For example, TAI timestamp and metadata 406a are correlated to the beginning of bootstrap 402a of frame 401a. This frame beginning is illustrated in FIG. 4 as reference time tick 405a, 405b, respectively, which is the beginning of the first bootstrap symbol calibrated at antenna air interface of transmitter 111 of FIG. 1A.

The TAI timestamps and metadata 406 are used for one-way time transfer. The TAI timestamp and metadata 406a are carried only by the preamble 403a of the frame 401a, according some embodiments. In other words, signaling timestamps and metadata are carried only at the physical layer preamble 403a (e.g., physical layer A/322 preamble) for the purposes of one-way time transfer, according to some embodiments. The TAI timestamp and metadata 406b are carried only by the preamble 403b of the frame 401b, according to these example. In other words, signaling timestamps and metadata are carried only at the physical layer preamble 403b (e.g., physical layer A/322 preamble) for the purposes of one-way time transfer, according to these examples. In these examples, no timestamps or metadata are carried by payload 404. Additionally, and with reference to FIG. 3, in these examples, both timestamp and metadata are generated, transmitted, and received (and recovered) based on the broadcast physical layer 301 of FIG. 3 and no timestamp or metadata are generated or transmitted based on layers above the physical layer 301.

The generation and transmission of the timestamp and metadata at the physical layer and placing the timestamp and metadata at the preamble of the frame enables the mobile receivers to quickly receive, retrieve and use the timing information. The use of the timestamp and metadata at the preamble of the frames results in speed, robustness, and extensibility of the one-way time transfer in mobile environments.

Figure 5:
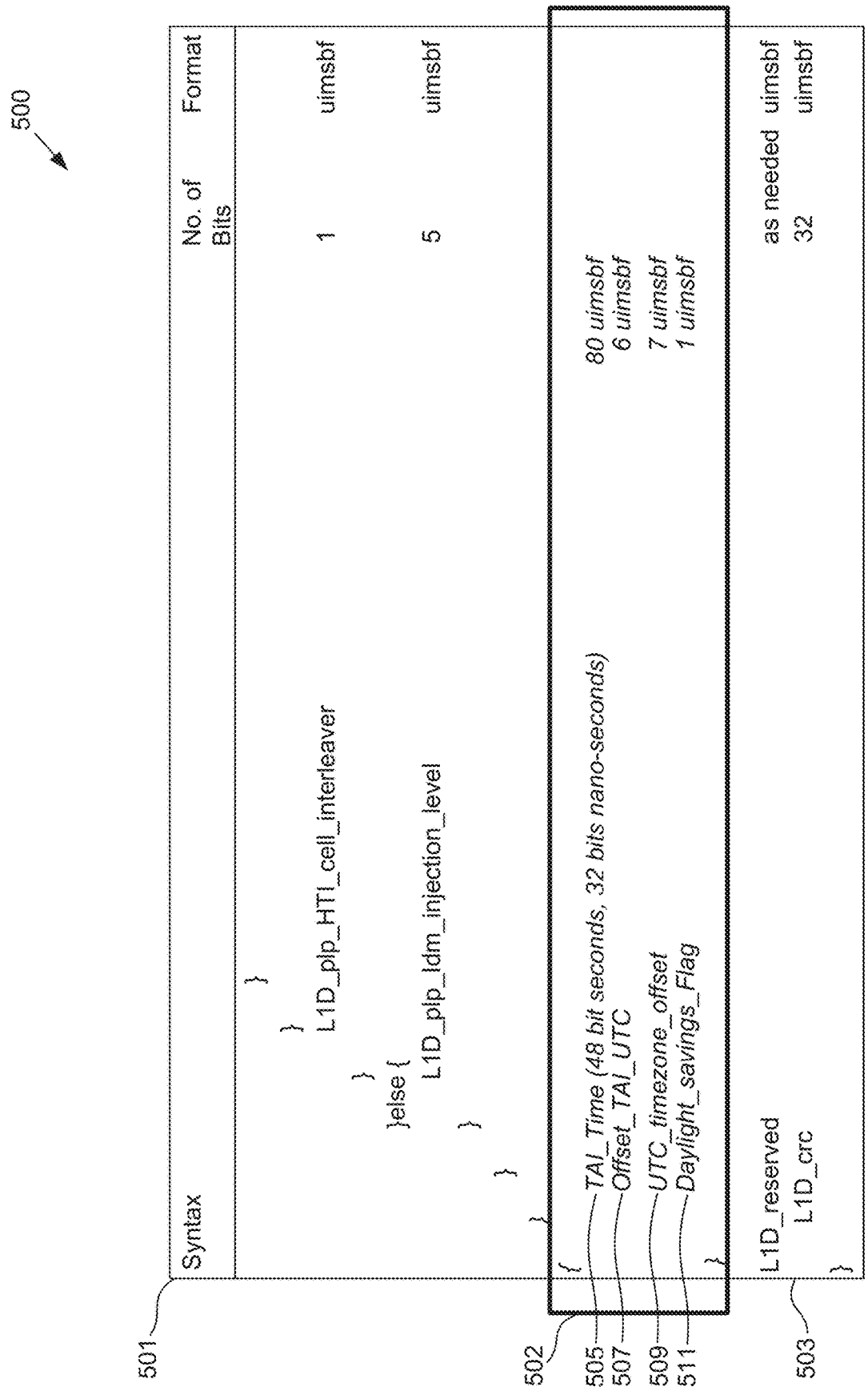
FIG. 5 illustrates an exemplary physical layer signaling syntax, according to some of the embodiments.

FIG. 5 illustrates an exemplary physical layer signaling syntax 500 for implementing some of the embodiments of this disclosure. According to some embodiments, syntax 500 can be used with ATSC 3.0 A/322 standard. For example, syntax 500 can include a section 501 which is the last section in L1 detail signaling table 9.8 described in ATSC 3.0 A/322, which is incorporated herein by reference in its entirety.

Syntax 500 includes a new section 502 for defining the signaling timestamps and metadata for the purposes of one-way time transfer. According to some examples, the gateway 107 and/or the exciter 109 of FIG. 1A can use L1B_L1_Detail_size_bytes from table 9.2 of ATSC 3.0 A/322 L1 Basic signaling (incorporated herein in its entirety) to make room for including 502 the signaling timestamps and metadata for the purposes of one-way time transfer are inserted just before L1D_reserved field in syntax 500. This placement ensures backward compatibility and extensibility for inserting 502 for mobile environments. This means there will be two methods for signaling TAI timestamps and metadata. The original dispersed method described in standard and the new method for mobile using just signaling in physical layer 502.

The syntax 500 is backward compatible. It means that if there are receivers that are not configured to receive and recover the timestamp and metadata from the preamble, these receivers can ignore the additional information at the preamble that signal the metadata. In other words, the additional bits just before L1D_reserved 503 if present will be treated as stuffing bits and will be ignored by these receivers. In this example, the section 502 of syntax 500 is located just before the L1D_reserved 503 so that these bits can be ignored (treated as stuffing) for receivers that are not configured to receive and determine the timestamp and metadata from the preamble signaling 502.

The section 502 for defining the signaling timestamps and metadata for the purposes of one-way time transfer can include a TAI_Time 505. The TAI_Time 505 can include 48-bit seconds, 32-bit nanoseconds, according to some examples. This 80-bit count can be time since epoch January 1, 1970 00:00:00 International Atomic Time (TAI), which is also equivalent to IEEE 1588 Precision Time Protocol (PTP). It is noted that this is one example, and the embodiments of this disclosure can include other configurations for the TAI_Time 505.

The section 502 can also include an Offset_TAI_UTC 507. The Offset_TAI_UTC 507 can include 6 bits used to indicate the offset (result of leap seconds) between TAI and UTC, according to some examples. Calculating the UTC given the TAI seconds can include: UTC seconds=TAI Seconds+2,208,988,800−current offset UTC, according to some examples.

The section 502 of syntax 500 can further include a UTC_timezone_offset 509. According to some embodiments, the UTC_timezone_offset 509 can include 7 bits for time zone offset to UTC and can be expressed in 15-minute increments to cover all world time zones.

The timing information in the broadcast signal transmitted using, for example, the gateway 107, the exciter 109, and the transmitter 111 of FIG. 1A can be expressed with respect to a geographic location of, for example, the gateway 107, the exciter 109, or the transmitter 111. The transmitter 111 can include a high power high height broadcast transmitting station, according to some embodiments. The high power high height broadcast transmitting station can have a wide signal coverage area. The coverage area can be more than 60 km, in some examples. Under some conditions, a broadcast signal may propagate and be received in an adjacent time zone. Large countries have several time zones and it is the receiver that determines its location and time zone, and civil time (wall clock). The timing information that is broadcasted is correct with respect to the transmitting station's geographic location and correlates to the content/data timestamps in the broadcast and is used for delivery and consumption at the receiver.

The section 502 of syntax 500 can further include a Daylight_savings_Flag 511, according to some embodiments. The Daylight_savings_Flag 511 can be a 1-bit flag indicting if the gateway 107, the exciter 109, or the transmitter 111 transmitting the content/data is in daylight savings time.

The L1D_reserved 503 in syntax 500 can be used to ensure even byte alignment and is calculated in value L1B_L1_Detail_size_byes (table 9.2 of ATSC 3.0 A/322.) The L1D_crc of syntax 500 can be calculated across L1 detail signaling including the section 502 of syntax 500.

According to some embodiments, the timestamp and metadata 406 of FIG. 4 are generated and transmitted to the receivers using the syntax 500. In some embodiments, the timestamp includes the TAI_Time 505 and the metadata includes the Offset_TAI_UTC 507, the UTC_timezone_offset 509, and the Daylight_saving_flag 511. As discussed above, both the timestamp and the metadata are placed in the preamble with much increased robustness (e.g., −9 dB SNR) of each frame and are generated, transmitted, received, and recovered using the physical layer signaling. Therefore, mobile devices can connect and consume content quickly in the broadcast signal to enable diverse use cases and battery efficiency.

Figure 6:
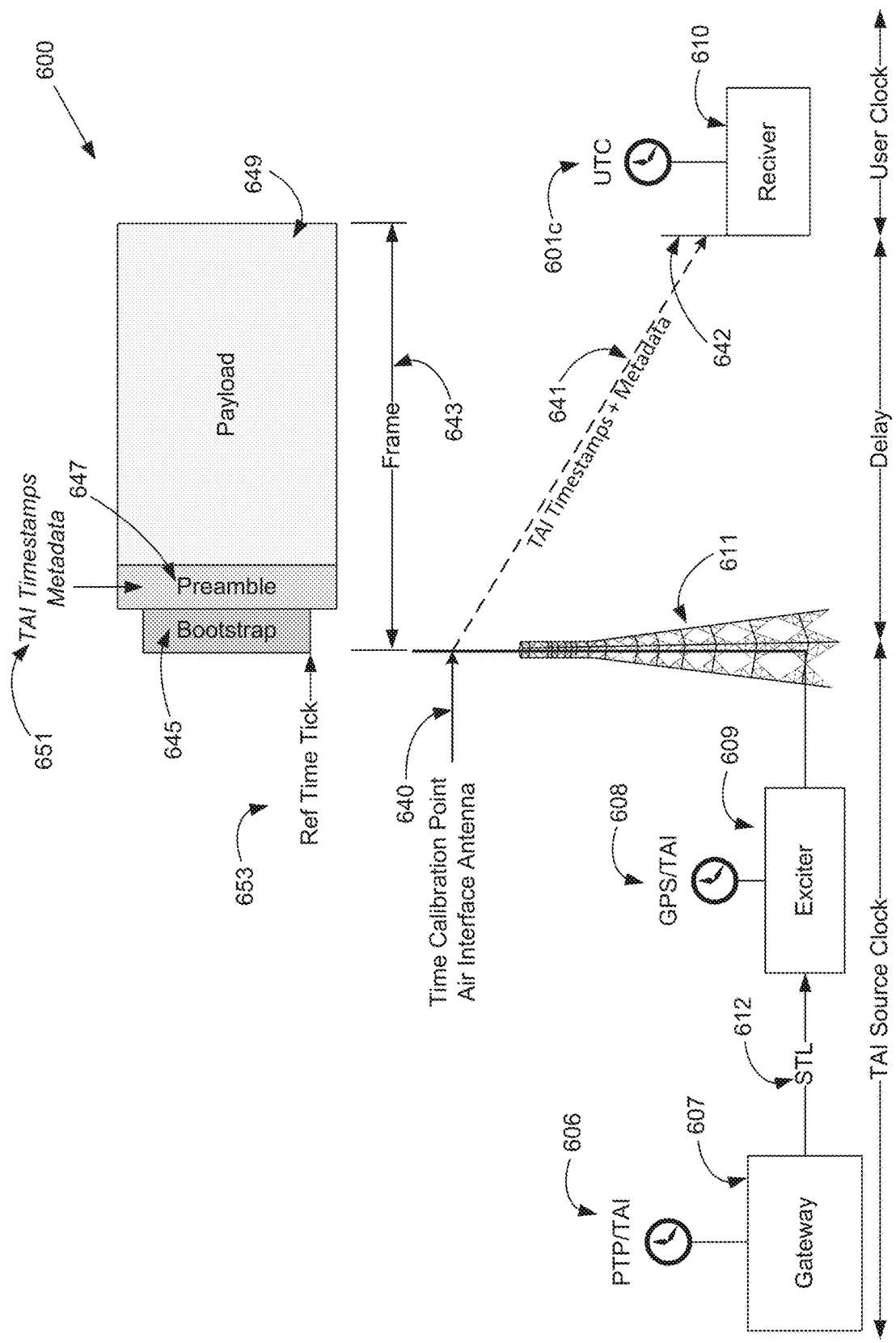
FIG. 6 illustrates a block diagram of a network implementing the one-way time transfer, according to some embodiments.

FIG. 6 illustrates a network 600, according to some embodiments of this disclosure. Network 600 can include gateway 607 including clock 606, exciter 609 including clock 608, transmitter 611, and receiver device 610 including clock 601c. Network 600 can be used for broadcasting one-way time transfer according to some embodiments of this disclosure.

In some examples, the gateway 607, the exciter 609, and the receiver 611 can be based on ATSC 3.0 standard.

According to some embodiments, the gateway 607 includes (or is associated with) clock 606. The clock 606 can include a TAI clock and can be monotonically increasing with no leap seconds. Clock 606 can be derived from GPS, according to some examples. The gateway 607 is configured to initiate the generation and transmission of frame 643. For example, the gateway 607 is configured to receive data from, for example, the MMT sending entity 105 of FIG. 1A. The gateway 607 transmits the received data and control information over studio-to-transmitter link (STL) 612 to the exciter 609. The data and control information transmitted by gateway 607 can include content formatted into physical layer pipes (PLPs), signaling, metadata, SFN timing, and transmission control. In some embodiments, the data and control information conforms to the ATSC 3.0 standard, and in such embodiments the gateway 607 is an ATSC 3.0 gateway. The STL 612 can include a fiber or dedicated microwave connection between the gateway 607 and the exciter 609. However, it is noted that the gateway 607 and the exciter 609 can be communicatively coupled using other means.

The exciter 609 processes the data and control information to create an RF waveform suitable for broadcast by the transmitter 611. The transmitter 611 wirelessly broadcasts the RF signal to the receiver device 610. According to some examples, the RF signal can include the frame 643. In some embodiments, the receiver device 610 can be a fixed device such as a television receiver or a desktop computer. In other embodiments, the receiver device 610 can be a nomadic device such as a tablet computer or laptop computer. In still further embodiments, the receiver device 610 can be a mobile device such as a mobile phone, automobile-based device, aircraft-based device, etc. Although FIG. 6 illustrates one gateway 607, one exciter 609, one transmitter 611, and one receiver device 610, there is no limit to the number of these devices.

According to some embodiments, the exciter 609 includes (or is associated with) the clock 608. The clock 608 can include a TAI clock and can be controlled by GPS and/or the gateway 607. As discussed above, the exciter 609 uses the data and control information the exciter 609 receives from the gateway 607 to generate the frame 643. The exciter 609 uses the clock 606 and/or clock 608 to determine the time to deliver the beginning of the frame 643. In other words, the exciter 609 uses the clock 606 and/or clock 608 to determine the reference time tick 653 for delivering the beginning of the frame 643. The exciter 609 transmits the frame 643 using the transmitter 611.

As discussed above with respect to, for example, FIG. 4, frame 643 can include bootstrap 645, preamble 647, and payload 649. The preamble 647 includes a TAI timestamp and metadata 651. The TAI timestamp and metadata 651 is correlated to the beginning of its bootstrap 645 illustrated as the reference time tick 653. The TAI timestamp and metadata 651 is used for one-way time transfer. The TAI timestamp and metadata 651 is carried by the preamble 647 of the frame 643, according some embodiments. In other words, TAI timestamp and metadata 651 is carried at the physical layer preamble 647 (e.g., physical layer A/322 preamble) for the purposes of one-way time transfer. In this example, the timing demarcation point 640 is a calibration point for time transfer and the TAI timestamp and metadata 651 is accurate at the reference time tick 653. According to some embodiments, the TAI timestamp and metadata 651 is generated based on the clock 606 or the clock 608. As shown in FIG. 1A the Gateway 107 given the known constant end to end delay from input 107 and air interface of antenna 111 releases the frame 643 into STL 612 at the exact correct instant to ensure 643 arrival at the calibration point 640 when TAI Timestamp value in 643 is correct and hence calibrated at 640.

The frame 643 (e.g., a broadcast frame) propagates 641 from the transmitter 611 to the receiver device 610. The frame 643 includes the TAI timestamp and metadata 651 at the preamble 647. The propagation 641 of the frame 643 includes a transmission delay. The transmission delay can be a delay of around 3.3 µs per Km. Therefore, one source of error with respect to the TAI timestamp and metadata 651 received at the receiver device 610 can be contributed to the flight time between the transmitter 611 and the receiver device 610. This error is acceptable error for heterogeneous networks using the MMT standard.

After receiving the frame 643, which includes the TAI timestamp and metadata 651, the receiver device 610 is configured to establish or adjust the clock 601c based on the received TAI timestamp and metadata 651 and becomes a synchronized UTC clock 601c.

Figure 7:
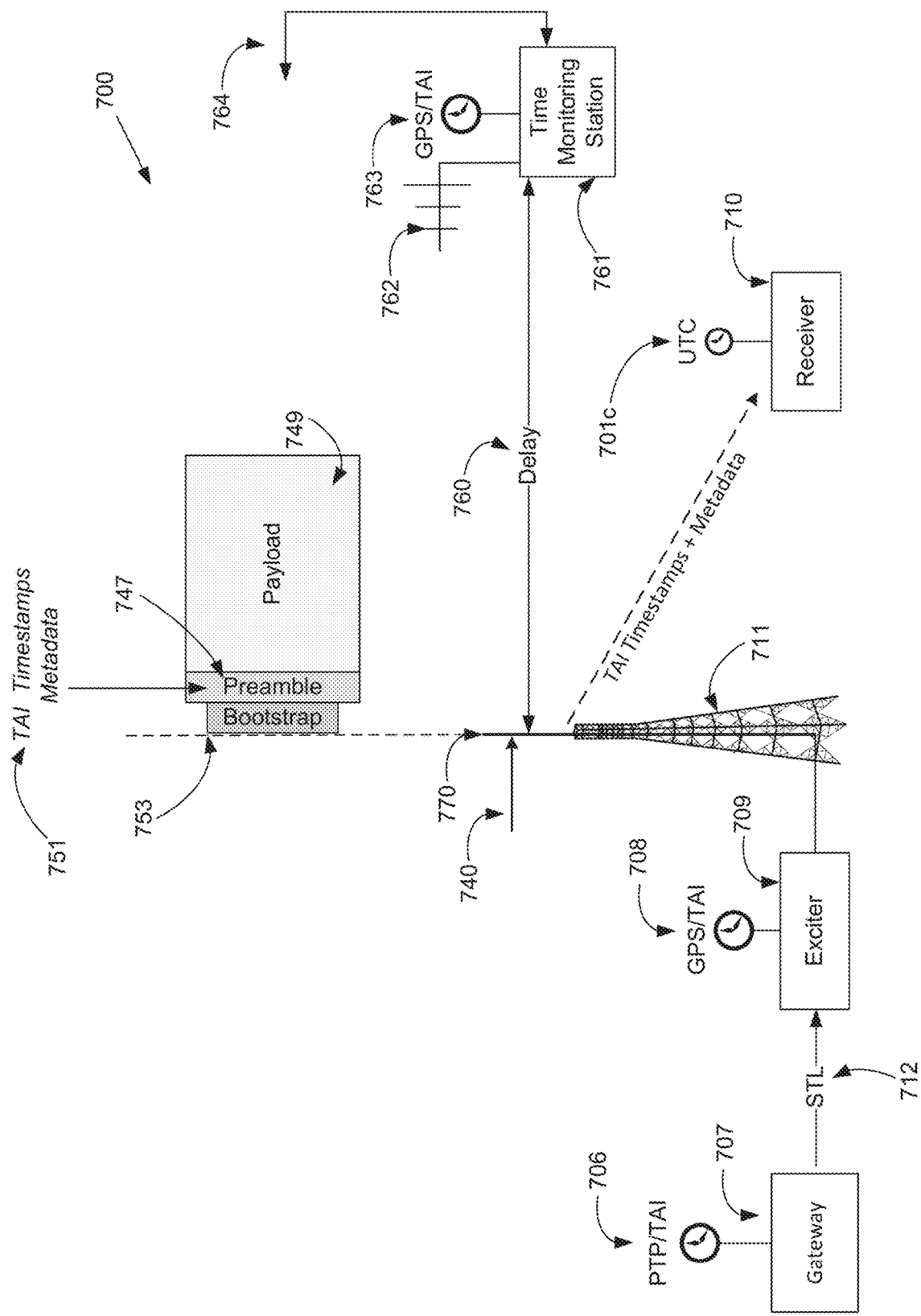
FIG. 7 illustrates a block diagram of a network implementing the one-way time transfer including a monitoring device, according to some embodiments.

FIG. 7 illustrates a network 700, which includes a time monitoring/measurement station. Network 700 of FIG. 7 includes elements similar to the elements of the network 600 of FIG. 6. Additionally, network 700 includes a time monitoring/measurement station 761.

For example, network 700 can include gateway 707 including clock 706, exciter 709 including clock 708, transmitter 711, and receiver device 710 including clock 701c. Network 700 can be used for broadcasting one-way time transfer method according to some embodiments of this disclosure. In some examples, the gateway 707, the exciter 709, and the receiver 711 are similar to the gateway 607, the exciter 609, and the receiver 611 of FIG. 6, and therefore, their operations are not repeated for brevity.

Similar to the network 600 of FIG. 6, the gateway 707 includes (or is associated with) clock 706, according to some embodiments. The clock 706 can include a TAI clock and can be monotonically increasing with no leap seconds. Clock 706 can be derived from GPS, according to some examples. According to some embodiments, the exciter 709 includes (or is associated with) the clock 708. The clock 708 can include a TAI clock and can be controlled by GPS and/or the gateway 707. The exciter 709 uses the clock 706 and/or clock 708 to determine the time to deliver the beginning of the frame 743. In other words, the exciter 709 uses the clock 706 and/or clock 708 to determine the reference time tick 753 for delivering the beginning of the frame 743. The exciter 709 transmits the frame 743 using the transmitter 711.

As discussed above with respect to, for example, FIG. 4, frame 743 can include a bootstrap 745, a preamble 747, and a payload 749. The preamble 747 includes TAI timestamp and metadata 751. The TAI timestamp and metadata 751 is correlated to the beginning of its bootstrap 745 illustrated as the reference time tick 753. The TAI timestamp and metadata 751 is used for one-way time transfer. The TAI timestamp and metadata 751 is carried by the preamble 747 of the frame 743, according to some embodiments. In other words, TAI timestamp and metadata 751 is carried at the physical layer preamble 747 (e.g., physical layer A/322 preamble) for the purposes of one-way time transfer. In this example, the timing demarcation point 740 is a calibration point for time transfer and the TAI timestamp and metadata 751 is accurate at the reference time tick 753. According to some examples, the TAI timestamp and metadata 751 is generated based on the clock 706 and/or the clock 708.

After receiving the frame 743, which includes the TAI timestamp and UTC metadata 751, the receiver 710 is configured to establish the clock 701c based on the received TAI timestamp and metadata 751. Clocks 706, 708, and 701c are similar to clocks 606, 608, and 601c as discussed with respect to FIG. 6. Similarly, frame 743 and its parts are similar to frame 643 and its parts as discussed with respect to FIG. 6.

In addition to similar elements discussed with respect to FIG. 6, network 700 includes the time monitoring/measurement station 761. According to some examples, the time monitoring/measurement station 761 can operate according to ATSC 3.0. The time monitoring/measurement station 761 includes an antenna 762 and a clock 763, according to some embodiments. In some examples, the antenna 762 can include a directional antenna. The directional antenna of the time monitoring/measurement station 761 can be directed toward an antenna 770 of transmitter 711. In some example, the clock 763 can include a TAI clock.

According to some embodiments the location (e.g., the coordinates) of the antenna 770 of transmitter 711 is known. Additionally, the location (e.g., the coordinates) of the time monitoring/measurement station 761 is also known. For example, the locations of the antenna 762 and the time monitoring/measurement station 761 are surveyed. Given the known locations of the antenna 770 and the time monitoring/measurement station 761, the distance 760 between the antenna 770 and the time monitoring/measurement station 761 can be calculated. Using distance 760, the time monitoring/measurement station 761 can determine a first delay between transmission of the frame 743 from the antenna 770 and the receipt of the frame 743 at the time monitoring/measurement station 761.

The time monitoring/measurement station 761 is also configured to retrieve the TAI timestamp and metadata 751 from the frame 743. The time monitoring/measurement station 761 is then configured to compare the TAI timestamp and metadata 751 with its time derived from its clock 763. The time monitoring/measurement station 761 is also configured to compare any delay between TAI timestamp and metadata 751 and its time derived from its clock 763 with the determined delay 760 between transmission of the frame 743 from the antenna 770 and the receipt of the frame 743 at the time monitoring/measurement station 761.

Based on any difference between these two delays, the time monitoring/measurement station 761 can determine that there are some errors in the TAI timestamps and metadata that is being transmitted by the transmitter 711 at calibration point 740. The time monitoring/measurement station 761 can report this error to an operator of the network 700 to assist or improve the time accuracy. Additionally or alternatively, the time monitoring/measurement station 761 can report this error to the receiver 710, the exciter 709, or gateway 707.

Although one antenna 770, one transmitter 711, and one time monitoring/measurement station 761 are illustrated in FIG. 7, the network 700 can include one or more antennas, transmitters, and time monitoring/measurement stations. The time monitoring/measurement station 761 can monitor multiple transmitters and/or multiple antennas and report any frequency or timing errors in the network 700 as a service of the network operator.

Figure 8:
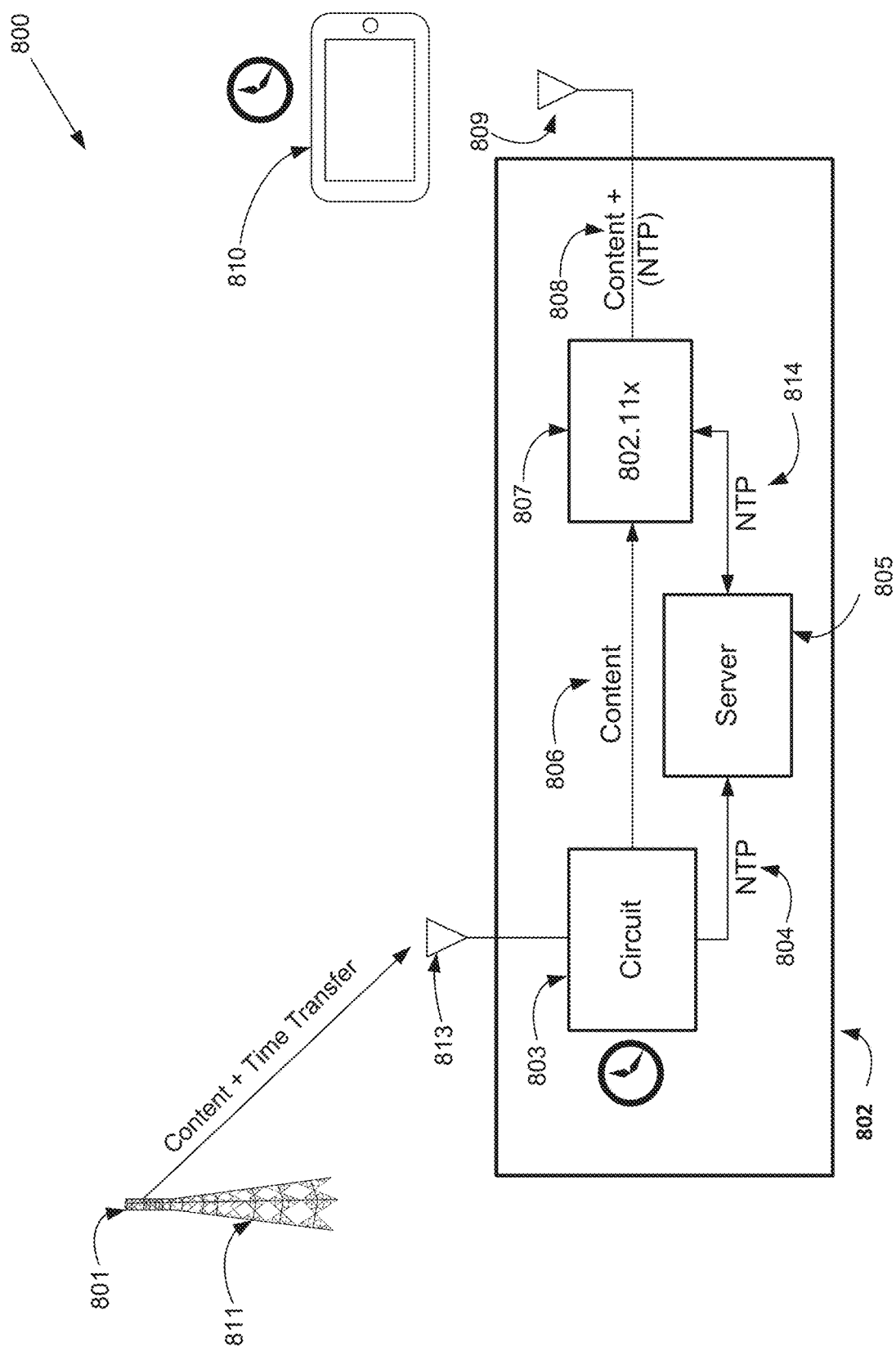
FIG. 8 illustrates a network including a gateway, according to some embodiments.

FIG. 8 illustrates a network 800 including a gateway, according to some embodiments of this disclosure. FIG. 8 illustrates the gateway 802 (e.g., a consumer gateway) as an intermediary between a transmitter 811 and a receiver device 810. According to some examples, the gateway 802 can include a consumer home gateway, a vehicle gateway, or other gateways. In some examples, the gateway 802 can operate according to ATSC 3.0 and have capabilities corresponding to IEEE 802.11xx standards. The IEEE 802.11xx standards can include standards used in Wireless Local Area Network (WLAN), Wide Area Network (WAN), Wi-Fi, Direct Sequence Spread Spectrum (DSSS), Orthogonal Frequency Division Multiplexing (OFDM), and the like. For example, the IEEE 802.11xx standards can include, but is not limited to, IEEE 802.11-1997, IEEE 802.11a, IEEE 802.11b, IEEE 802.11g, IEEE 802.11n. The gateway 802 is configured to receive content/data, control information, and/or timing information from the transmitter 811 and transmit the content/data, control information, and/or the timing information to the receiver device 810. According to some examples, the timing information can include the TAI timestamp and metadata discussed above.

According to some examples, the gateway 802 can also include capabilities corresponding to IEEE 802.11xx standards and can communicate with the receiver device 810 using the IEEE 802.11xx standards. It is noted that operations corresponding to IEEE 802.11xx is provided as one example, and the gateway 802 and the receiver device 811 can communicate using other protocols, such as, but not limited to, Bluetooth, Bluetooth Low Energy, Zigbee, etc.

The gateway 802 is configured to receive the broadcast signal from the transmitter 811 based on a first radio access technology, recover the content/data, control information, and timing information from the received broadcast signal, and transmit the content/data to the receiver 810 using a second radio access technology. According to some examples, the first and second radio access technologies are different radio access technologies. For example, the gateway 802 is configured to receive the broadcast signal from the transmitter 811 based on ATSC 3.0 and the gateway 802 is configured to transmit a signal to the receiver device 810 based on IEEE 802.11xx.

The gateway 802 can include a demodulation and time recovery circuit 803, a server 805, a transmitter 807, and antennas 809 and 813, according to some embodiments. In one example, the antenna 813 of the gateway 802 receives a broadcast signal from the transmitter 811. The demodulation and time recovery circuit 803 receives the broadcast signal through the antenna 813. According to some embodiments, the demodulation and time recovery circuit 803 recovers the content/data, control information, and timing information from the received broadcast signal and sends the content/data to the transmitter 807.

The transmitter 807 transmits the content/data, using for example the antenna 809, to the receiver device 810 based on, for example, IEEE 802.11xx. In some examples, the receiver device 810 may include an MMT client device. The receiver device 810 may include an MMT client device with Network Time Protocol (NTP) capabilities based on UTC. According to some examples, a user of the receiver device 810 can select a desired MMT content for playback. The receiver device 810 can receive the content once an NTP/UTC clock is established.

In addition to recovering the content/data, the demodulation and time recovery circuit 803 recovers the TAI timestamp and metadata from the received broadcast signal. The gateway 802 uses the recovered TAI timestamp and metadata for synchronization and establishing a NTP/UTC Server 805 locked to Broadcast time transfer. According to some embodiments, the demodulation and time recovery circuit 803 sends the recovered TAI timestamp and metadata in the NTP time format 804 to the server 805. In some examples, the server 805 can include an NTP server. The server 805 is also communicatively coupled to the transmitter 807. The transmitter 807 uses timing information at the server 805 and the content/data from the demodulation and time recovery circuit 803 to transmit the content/data to the receiver 810.

According to some embodiments, the gateway 802 can concatenate one or more broadcast delivery channels and one or more IEEE 802.11 xx delivery channels to reach the receiver device 810 when the UTC clock is first established at the receiver device 801. In this example, a NTP two-way time transfer method is used for the IEEE 802.11xx segment. The client 810 requests and receives time using NTP 814 using two-way protocol.

Figure 9A:
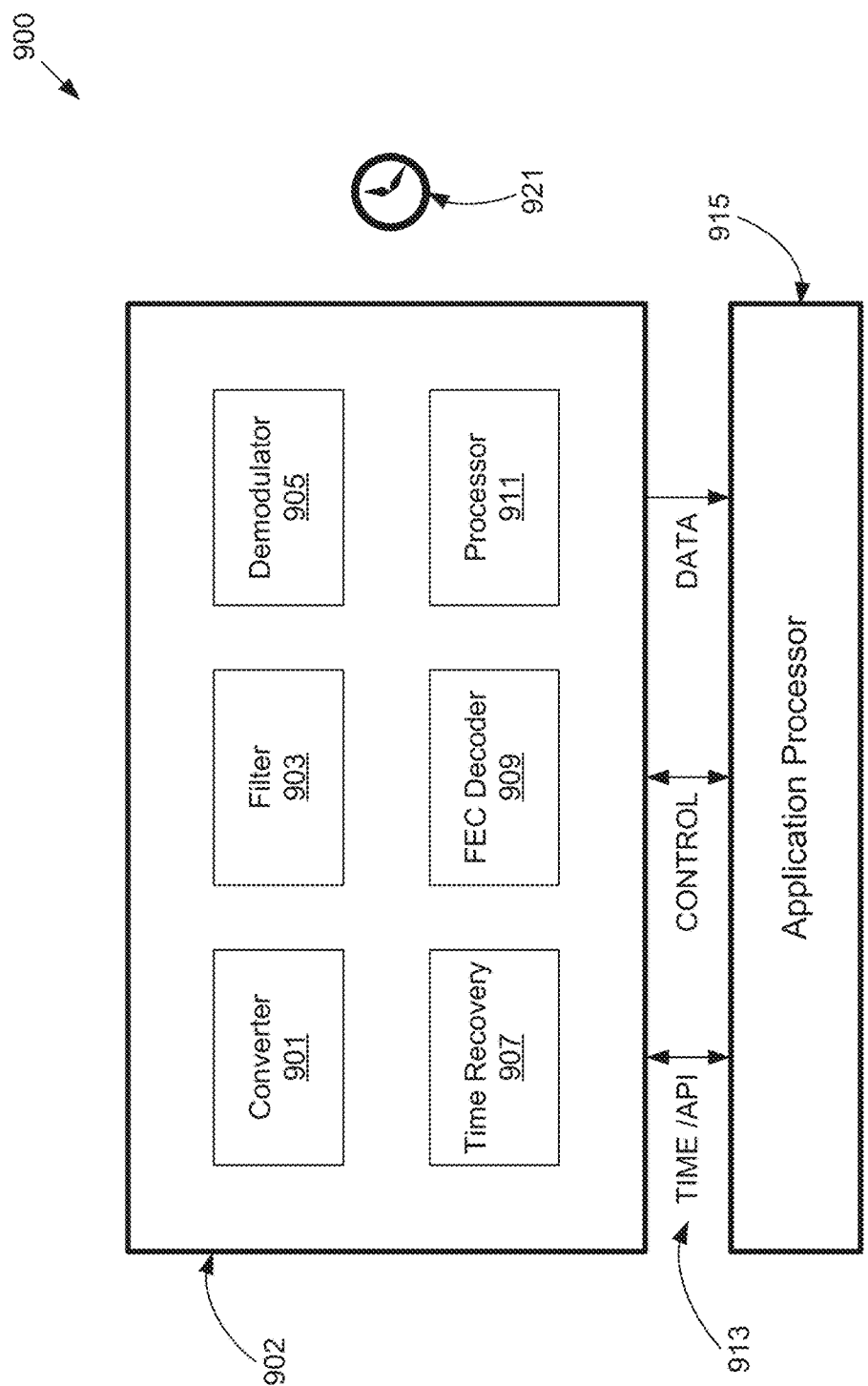
FIG. 9A is a functional block diagram depicting one example system implementing a receiver device, according to some embodiments.

FIG. 9A is a functional block diagram depicting one example system implementing receiver device 900, according to some embodiments. The receiver device 900 of FIG. 9 can be part of the receiver devices 110, 610, 710, or 810 of FIGS. 1, 6, 7, and 8. Additionally, receiver device 900 can depict part of the gateway 802 (e.g., the demodulation and time recovery circuit 803 of the gateway 802) of FIG. 8.

The system 900 can include converter 901, filter 903, demodulation circuit 905, time recovery circuit 907, forward error correction (FEC) decoder 909, processor 911, interface 913, application processor 915, clock 921. The circuits and/or modules illustrated in FIG. 9A are exemplary elements and the system 900 can include other circuits and/or modules.

After receiving the broadcast signal from a transmitter (e.g., the transmitter 811 of FIG. 8) through an antenna (e.g., the antenna 813 of FIG. 8), the converter 901 converts the received analog broadcast signal to digital signal. The converter 901 can include an analog to digital converter (ADC). According to some examples, the converter 901 can include an in-phase/quadrature (I/Q) ADC. The digital signal can be input to the filter 903 where the useful part of the digital signal is selected. Additionally, the filter 903 can also sample and/or re-sample the digital signal.

The filtered digital signal is input to the demodulation circuit 905 where the filtered digital signal is demodulated to recover the data from the received signal. According to some examples, the recovered data can include the content/data, timing information, and/or control information. The recovered data can be input to the time recovery circuit 907 such that the timing information is recovered. The timing information can include the TAI timestamp and metadata transmitted in the broadcast signal and can be used by the system 900 to establish or adjust its clock 921 and also for synchronization purpose. The recovered signal can also be input to the FEC decoder 909 to check for and/or correct any error in the content/data.

The content/data can further be input to the processor 911. According to some examples, the processor 911 can include an ATSC Link-layer Protocol (ALP) processor. The processor 911 can be configured to convert the content/data into a format that can be consumed by the application processor 915, in some examples.

According to some embodiments, the converter 901, the filter 903, the demodulation circuit 905, the time recovery circuit 907, the FEC decoder 909, and the processor 911 are configured to operate at the physical layer of the system 900. Alternatively, the processor 911 can operate at the link layer of the system 900. Therefore, the system 900 is configured to receive and recover the TAI timestamp and metadata at the physical layer.

The recovered timing information, the recovered content/data, and/or the recovered control information are sent, using the interface 913, to the application processor 915. According to some embodiments, the application processor 915 can include one or more processor to process the content/data receive through the interface 913. For example, the application processor 915 can be configured to process and display the content/data on a display (not shown) of system 900. Additionally or alternatively, the application processor 915 can be configured to process and transmit the content/data to other receiver devices.

FIG. 9B illustrates using baseband sampling rate (BSR) 931 in ATSC 3.0 standard for establishing a TAI/UTC clock using the broadcast physical layer, according to some embodiments. The equation used for calculating BSR is BSR=(16+N)×0.384 MHz. According to some example, for calculating the BSR for bootstrap, which is located at the beginning of an ATSC 3.0 frame, N=0, independent of bandwidth. The rest of the frame (e.g., the preamble and the payload) has a sampling rate and value N as a function of bandwidth of the channel they are transmitted on. For example, the ATSC 3.0 specifies 6, 7, 8 MHz bandwidths for broadcast.

According to some examples, using the above equation for BSR can cause an integer number of samples as shown in 931. In this example, the timing information at the receiver device, which is supported at the physical layer by the sampling frequency used, can be recovered by ensuring integer number of samples per second. The receiver device knows the BSR of each portion of the broadcast frame, and therefore, time transfer integrity is maintained.

Figure 10:
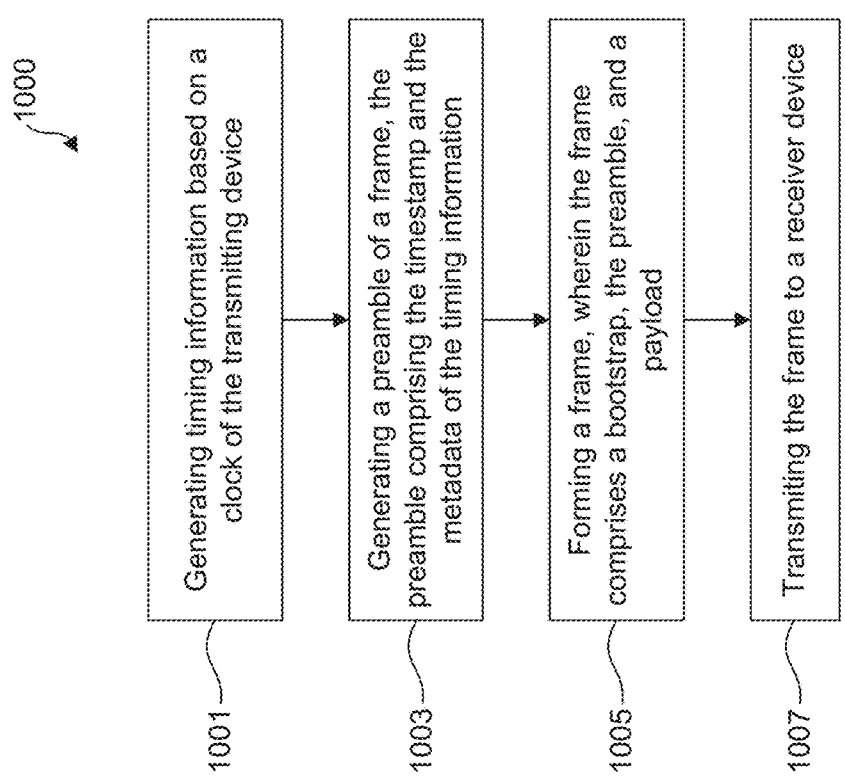
FIG. 10 is a flowchart depicting a method generating and transmitting timing information including timestamps and metadata, according to some embodiments.

FIG. 10 is a flowchart depicting a method 1000, according to an embodiment of the present disclosure. For example, method 1000 can generate and transmit timing information including timestamps and metadata, according to some embodiments. In one embodiment, method 1000 is performed by system 100 of FIG. 1A, system 600 of FIG. 6, and/or system 700 of FIG. 7. It is to be appreciated not all steps may be needed, and the steps may not be performed in the same order as shown in FIG. 10. Reference is made to systems 100, 600, or 700 in FIG. 1, 6, or 7 merely for convenience of discussion. Other systems may be used to perform the method as will be understood by those skilled in the arts.

In 1001, a gateway (e.g., the gateway 107, 607, or 707) and/or an exciter (e.g., the exciter 109, 609, or 709) generate timing information based on their clock(s). The timing information can include a timestamp and metadata associated with the timestamp. The clock used in generating the timestamp can include TAI clock and the timestamp is based on the TAI clock. The metadata of the timing information can include information associated with a time zone of where the gateway, the exciter, or a transmitter used to transmit the timing information is located. The metadata can include a flag for indicating whether daylight saving applies and the metadata can include offset information for determining UTC clock at a receiver device.

In 1003, the gateway and/or the exciter can generate a preamble of a frame. The preamble of the frame can include the timestamp and the metadata. Generating the preamble of the frame can include placing the timestamp and the metadata of the timing information within the preamble. The gateway and/or the exciter generates the preamble using physical layer signaling.

In 1005, the gateway and/or the exciter can from the frame for transmission to the receiver device. The frame can include a bootstrap, the preamble, and a payload.

In 1007, the gateway and/or the exciter are configured to initiate transmission of and transmit the frame to the receiver device. The gateway and/or the exciter can use a transmitter (e.g., the transmitter 111, 611, 711, or 811) to transmit the frame. The frame can be compliant with the ATSC 3.0 specification. Transmitting the frame can include broadcasting the frame to one or more receivers.

Figure 11:
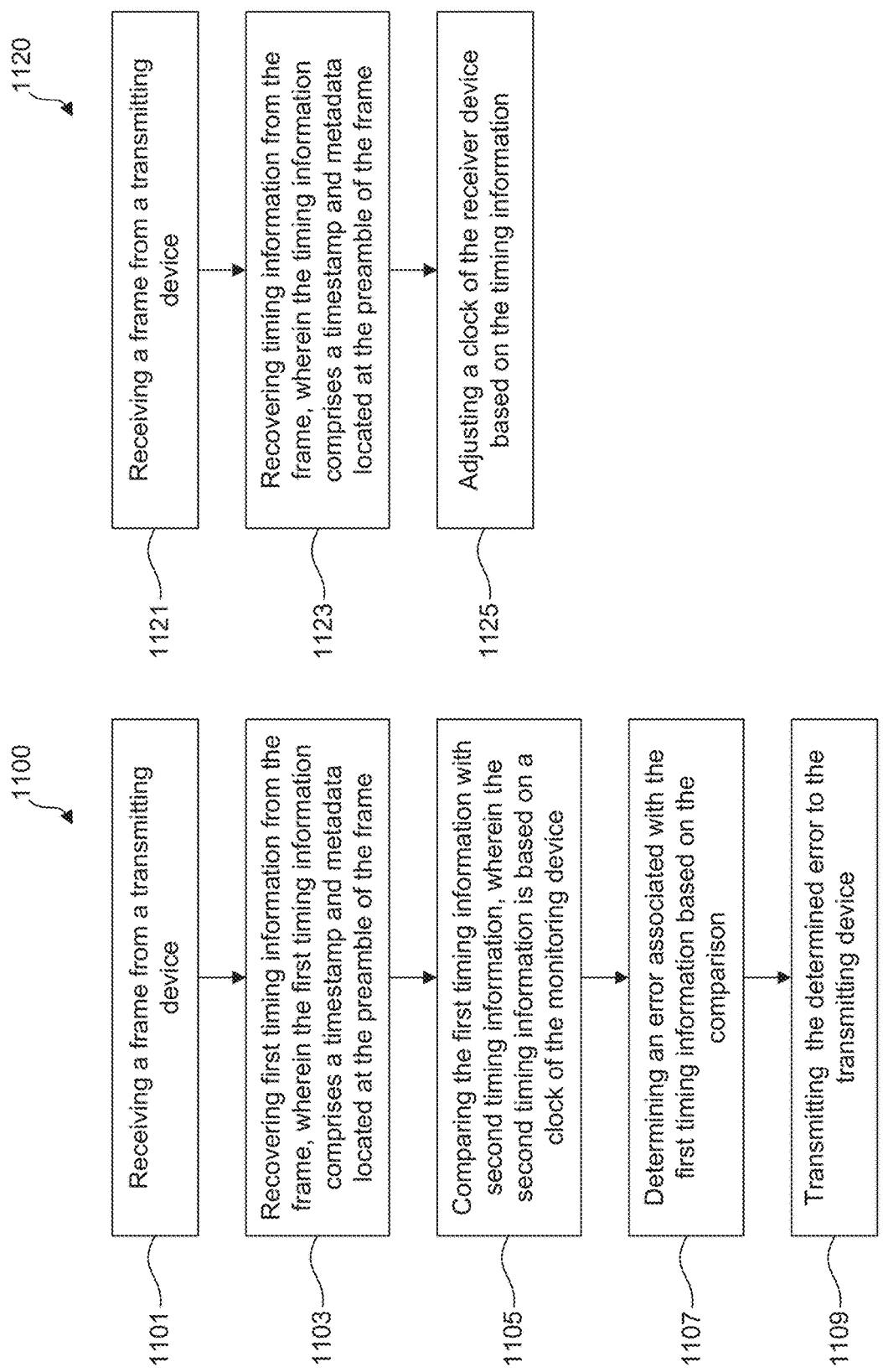
FIG. 11A is a flowchart depicting a method for monitoring timing information, according to some embodiments.
FIG. 11B is a flowchart depicting a method for receiving timing information including timestamps and metadata and establishing a clock, according to some embodiments.

FIG. 11A is a flowchart depicting a method 1100, according to an embodiment of the present disclosure. For example, method 1100 can monitor timing information, according to some embodiments. In one embodiment, method 1100 is performed by system 700 of FIG. 7. It is to be appreciated not all steps may be needed, and the steps may not be performed in the same order as shown in FIG. 11A. Reference is made to system 700 in FIG. 7 merely for convenience of discussion. Other systems may be used to perform the method as will be understood by those skilled in the arts.

In 1101, a monitoring device, such as the time monitoring/measurement station 761, receives a frame from a transmitting device. The frame can include a bootstrap, a preamble, and a payload. In 1103, the monitoring device recovers first timing information from the frame. The first timing information includes a timestamp and metadata located at the preamble of the frame. The timestamp and metadata are generated based on a clock of the transmitting device.

In 1105, the monitoring device compares the first timing information with second timing information. The second timing information is based on a clock of the monitoring device. Based on the comparison, in 1107, the monitoring device determines whether the first timing information includes an error. In 1109, the monitoring device can report this error to an operator of a network including the transmitting device to assist or improve the time accuracy. Additionally or alternatively, the monitoring device can initiate transmission of and transmit (e.g., report) this error to the transmitting device (e.g., the receiver device 710, the exciter 709, or gateway 707.) In some examples, the receiver device 710 can use the received error in addition to received timing information to establish or adjust its clock.

To determine whether the received timing information includes any error, the monitoring device can determine a distance between the transmitting device and the monitoring device and determine a delay associated with the reception of the frame from the transmitting device. The monitoring device can use the determined delay in determining the error associated with the first timing information FIG. 11B is a flowchart depicting a method 1120, according to an embodiment of the present disclosure. For example, method 1120 can receive timing information including timestamps and metadata and establish a clock, according to some embodiments. In one embodiment, method 1120 is performed by system 100 of FIG. 1A, system 600 of FIG. 6, system 700 of FIG. 7, system 800 of FIG. 8, or system 900 of FIG. 9. It is to be appreciated not all steps may be needed, and the steps may not be performed in the same order as shown in FIG. 11B. Reference is made to systems 100, 600, 700, 800, or 900 in FIG. 1, 6, 7, 8, or 9 merely for convenience of discussion. Other systems may be used to perform the method as will be understood by those skilled in the arts.

In 1121, a receiver device (e.g., receiver device 110, 610, 710, 802, 810, 900) receives a frame from a transmitting device. The frame comprises a bootstrap, a preamble, and a payload. In 1123, the receiver device can recover timing information from the frame. The timing information can include a timestamp and metadata located at the preamble of the frame. In 1125, the receiver device can establish or adjust a clock of the receiver device based on the timing information. In some examples, the receiver device is configured to recover the timing information from the preamble at a physical layer. In some examples, the receiver device can also receive an error signal from a monitoring device and establish or adjust the clock of the receiver device based on the error signal and the timing information.

It is to be appreciated that embodiments of the disclosure can be implemented by a system having any combination of hardware, software, or firmware. A system can include, but is not limited to, a device having a processor and memory, including a non-transitory memory, for executing and storing instructions. A processor can include circuits configured to carry out logic and/or instructions to perform arithmetical, logical, and/or input/output (I/O) operations of the broadcast system and/or one or more components of the broadcast system. Examples of such circuits include field-programmable gate arrays (FPGAs), application-specific integrated circuits (ASICs), digital signal processors (DSPs), and general-purpose processors (GPPs). The memory can tangibly embody the data and program instructions. Software can include one or more applications and an operating system. Hardware can include, but is not limited to, a radio frequency (RF) transmitter including an RF front-end, an antenna, a processor, and a memory. The broadcast system can also have multiple processors and multiple shared or separate memory components.

Figure 12:
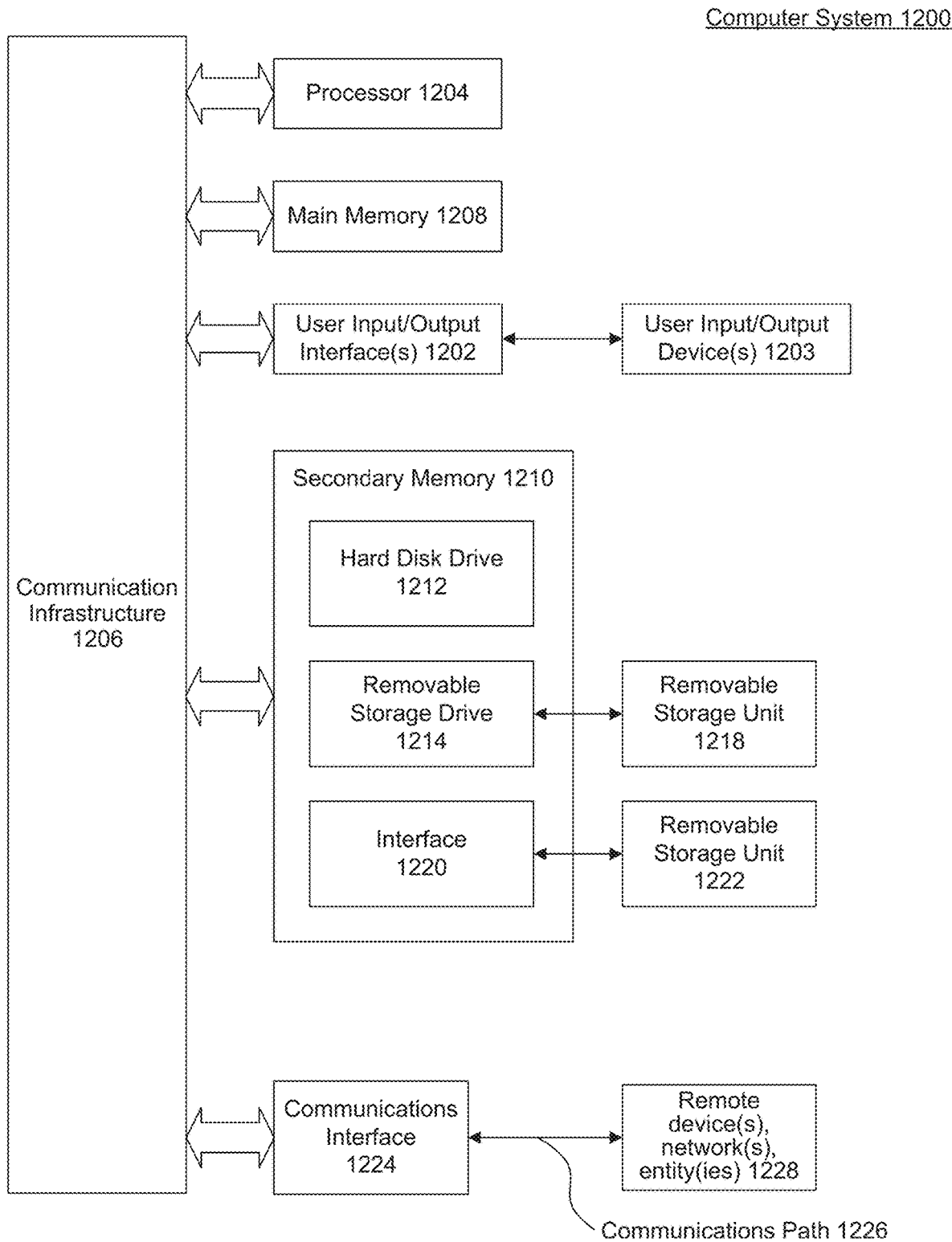
FIG. 12 illustrates a computer system that can be utilized to implement one or more embodiments.

For example, various embodiments can be implemented using one or more computer systems, such as computer system 1200 shown in FIG. 12. Computer system 1200 can be used, for example, to implement method discussed in this disclosure such as, but not limited to, method 1000 of FIG. 10, method 1100 of FIG. 11A, and/or method 1120 of FIG. 11B. Also, one or more of systems 100, 200, 600, 700, 800, and/or 900 or part of the systems can be implemented using computer system 1200. In one example, the MMT sending entity 105, the gateway 107, 607, 707, exciter 108, 608, 708, transmitter 111, 611, 711, 811, time monitoring station 761, receiver device 110, 610, 710, 810, 900, and/or gateway 802 can be implemented using the computer system 1200. Computer system 1200 can be any computer capable of performing the functions described herein.

Computer system 1200 can be any well-known computer capable of performing the functions described herein.

Computer system 1200 includes one or more processors (also called central processing units, or CPUs), such as a processor 1204. Processor 1204 is connected to a communication infrastructure or bus 1206.

Computer system 1200 also includes user input/output device(s) 1203, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 can include one or more levels of cache. Main memory 1208 has stored therein control logic (i.e., computer software) and/or data.

Computer system 1200 can also include one or more secondary storage devices or memory 1210. Secondary memory 1210 can include, for example, a hard disk drive 1212 and/or a removable storage device or drive 1214. Removable storage drive 1214 can be a solid state memory, a floppy disk drive, a magnetic tape drive, a compact disk drive, an optical storage device, tape backup device, and/or any other storage device/drive.

Removable storage drive 1214 can interact with a removable storage unit 1218. Removable storage unit 1218 includes a computer usable or readable storage device having stored thereon computer software (control logic) and/or data. Removable storage unit 1218 can be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 can include other means, instrumentalities or other approaches for allowing computer programs and/or other instructions and/or data to be accessed by computer system 1200. Such means, instrumentalities or other approaches can include, for example, a removable storage unit 1222 and an interface 1220. Examples of the removable storage unit 1222 and the interface 1220 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 can further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 can allow computer system 1200 to communicate with remote devices 1228 over communications path 1226, which can be wired and/or wireless, and which can include any combination of LANs, WANs, the Internet, etc. Control logic and/or data can be transmitted to and from computer system 1200 via communication path 1226.

In an embodiment, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

It will be apparent to those skilled in the relevant art(s) that various changes in form and detail can be made therein without departing from the spirit and scope of the disclosure. Thus, the disclosure should not be limited by any of the above-described exemplary embodiments. Further, the claims should be defined only in accordance with the following claims and their equivalents.

What is claimed is:

1. A broadcasting device, comprising:
   a clock;
   a memory storing program instructions; and
   a processor, upon executing the program instructions, configured to:
   generate timing information to be broadcast to a first receiver device based on the clock, wherein the timing information comprises a timestamp and metadata for the first receiver device;
   generate a preamble of a frame, the preamble comprising the timestamp and the metadata of the timing information for the first receiver device,
   wherein the timestamp and the metadata of the timing information for the first receiver device are located only in the preamble, and
   wherein the timestamp and the metadata of the timing information for the first receiver device are included in an L1 signaling of the preamble such that a second receiver device, not capable of recovering the timestamp and the metadata of the timing information for the first receiver device, ignores the timestamp and the metadata in the L1 signaling;
   form the frame, wherein the frame comprises a bootstrap, the preamble, and a payload; and
   initiate broadcasting the frame to the first and second receiver devices.

2. The broadcasting device of claim 1, wherein the processor is further configured to:
   generate second timing information to be broadcast to the second receiver device, wherein the second timing information comprises a second timestamp and a second metadata for the second receiver device;
   generate a second preamble of a second frame, wherein a part of the second timestamp and the second metadata of the second timing information for the second receiver device is located in the second preamble;
   form the second frame, wherein the second frame comprises a second bootstrap, the second preamble, and a payload; and
   initiate broadcasting the second frame to the first and second receiver devices,
   wherein the first receiver device is a mobile device and the second receiver device is a fixed device.

3. The broadcasting device of claim 1, wherein:
   the metadata of the timing information for the first receiver device comprises information associated with a time zone of where the broadcasting device is located and a flag for indicating whether daylight savings time applies; and
   the clock of the broadcasting device comprises an International Atomic Time (TAI) clock, and the timestamp of the timing information for the first receiver device is based on the TAI clock.

4. The broadcasting device of claim 3, wherein the metadata of the timing information for the first receiver device comprises offset information for determining a Universal Coordinated Time (UTC) clock at the first receiver device.

5. The broadcasting device of claim 1, wherein to form the frame, the processor is configured to form the frame compliant with an Advanced Television Systems Committee (ATSC) 3.0 specification.

6. The broadcasting device of claim 1, wherein the first receiver device is a mobile device and the broadcasting device is a Moving Picture Experts Group (MPEG) Media Transport (MMT) broadcasting device.

7. The broadcasting device of claim 1, wherein the processor is configured to generate the preamble of the frame using physical layer signaling.

8. A monitoring device, comprising:
   a clock;
   a memory storing program instructions; and
   a processor, upon executing the program instructions, configured to:

receive a frame from a transmitting device, wherein the frame comprises a bootstrap, a preamble, and a payload, recover first timing information from the frame, wherein the first timing information is for a first receiver device and comprises a timestamp and metadata located only at the preamble of the frame, wherein the timestamp and the metadata of the first timing information are included in an L1 signaling of the preamble such that a second receiver device, not capable of recovering the timestamp and the metadata of the first timing information, ignores the timestamp and the metadata in the L1 signaling;

compare the first timing information with second timing information, wherein the second timing information is based on the clock of the monitoring device; and determine an error associated with the first timing information based on the comparison.

9. The monitoring device of claim 8, wherein the first timing information is based on a clock of the transmitting device and wherein the transmitting device is a Moving Picture Experts Group (MPEG) Media Transport (MMT) transmitting device.

10. The monitoring device of claim 8, wherein the processor is further configured to:
determine a distance between the transmitting device and the monitoring device; and
determine a delay associated with the reception of the frame from the transmitting device.

11. The monitoring device of claim 10, wherein to determine the error, the processor is configured to determine the error associated with the first timing information based on the comparison and the determined delay.

12. The monitoring device of claim 11, wherein the processor is further configured to initiate transmission of the determined error to the transmitting device.

13. The monitoring device of claim 11, wherein the processor is further configured to initiate transmission of the determined error to the first receiver device, wherein the first receiver device comprises a mobile receiver device.

14. A receiver device, comprising:
a clock;
a memory storing program instructions; and
a processor, upon executing the program instructions, configured to:
receive a frame from a transmitting device, wherein the frame comprises a bootstrap, a preamble, and a payload,
recover timing information from the frame, wherein the timing information comprises a timestamp and metadata located only at the preamble of the frame,
wherein the timestamp and the metadata of the timing information are included in an L1 signaling of the preamble such that a second receiver device, not capable of recovering the timestamp and the metadata of the timing information, ignores the timestamp and the metadata in the L1 signaling; and
adjust the clock of the receiver device based on the timing information.

15. The receiver device of claim 14, wherein the metadata of the timing information comprises information associated with a time zone of where the transmitting device is located and a flag for indicating whether daylight saving applies.

16. The receiver device of claim 14, wherein the timing information is based on an International Atomic Time (TAI) clock of the transmitting device.

17. The receiver device of claim 16, wherein the clock of the receiver device comprises a Universal Coordinated Time (UTC) clock and the metadata of the timing information comprises offset information for the adjusting the clock of the receiver device.

18. The receiver device of claim 14, wherein the processor is configured to recover the timing information from the preamble of the frame at a physical layer.

19. The receiver device of claim 14, wherein the processor is further configured to:
receive an error signal from a monitoring device; and
adjust the clock of the receiver device based on the error signal and the timing information.

20. The receiver device of claim 14, wherein the receiver device comprises a gateway device between the transmitting device and a second receiver device.

* * * * *